US009817331B2

(12) United States Patent
Yoshida

(10) Patent No.: US 9,817,331 B2
(45) Date of Patent: Nov. 14, 2017

(54) IMAGE FORMING APPARATUS

(71) Applicant: CANON KABUSHIKI KAISHA, Tokyo (JP)

(72) Inventor: Hidefumi Yoshida, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/176,566

(22) Filed: Jun. 8, 2016

(65) Prior Publication Data

US 2016/0363884 A1 Dec. 15, 2016

(30) Foreign Application Priority Data

Jun. 12, 2015 (JP) ................................ 2015-119526

(51) Int. Cl.
*G03G 15/00* (2006.01)
*G03G 15/043* (2006.01)
*G06K 15/02* (2006.01)
*G03G 15/04* (2006.01)

(52) U.S. Cl.
CPC ..... *G03G 15/043* (2013.01); *G03G 15/04018* (2013.01); *G06K 15/1801* (2013.01)

(58) Field of Classification Search
CPC ........... G03G 15/043; G03G 15/04018; G03G 15/1801
USPC ............................................................ 399/4
See application file for complete search history.

(56) References Cited

U.S. PATENT DOCUMENTS

| | | | | | |
|---|---|---|---|---|---|
| 5,699,102 | A * | 12/1997 | Ng | H04N 1/4015 | 347/224 |
| 6,545,696 | B1 * | 4/2003 | Yamada | H04N 1/4015 | 347/240 |
| 2005/0207768 | A1 * | 9/2005 | Suzuki | G03G 15/5062 | 399/49 |
| 2005/0237548 | A1 * | 10/2005 | Suzuki | H04N 1/00015 | 358/1.9 |
| 2013/0141511 | A1 | 6/2013 | Hasegawa et al. | | |
| 2015/0153694 | A1 * | 6/2015 | Shirafuji | G03G 15/50 | 399/72 |

FOREIGN PATENT DOCUMENTS

| | | |
|---|---|---|
| JP | 2003-312050 | 11/2003 |
| JP | 2013-117622 | 6/2013 |

* cited by examiner

*Primary Examiner* — Susan Lee
(74) *Attorney, Agent, or Firm* — Fitzpatrick, Cella, Harper & Scinto

(57) ABSTRACT

An image forming apparatus including: a light irradiating unit configured to irradiate a photosensitive member charged by a charging unit with light to form an electrostatic latent image; a processing unit configured to generate M-bit (M is an integer not less than 2) density data indicating a density based on the input image data, to generate (M+N)-bit processing data based on the M-bit density data and N-bit (N is an integer not less than 1) correction data, to convert the processing data into a plural-bit binary drive data corresponding to a value of the processing data, and to serially output the plural-bit drive data bit by bit to generate a drive signal; and a drive unit configured to drive the light irradiating unit based on the drive signal.

29 Claims, 13 Drawing Sheets

| | bit3 | bit2 | bit1 | bit0 |
|---|---|---|---|---|
| INPUT IMAGE DATA | b3 | b2 | b1 | b0 |

| | bit5 | bit4 | bit3 | bit2 | bit1 | bit0 |
|---|---|---|---|---|---|---|
| SHIFT DATA | b3 | b2 | b1 | b0 | 0 | 0 |

| | bit5 | bit4 | bit3 | bit2 | bit1 | bit0 |
|---|---|---|---|---|---|---|
| SHIFT DATA | D3 | D2 | D1 | D0 | 0 | 0 |

| | bit1 | bit0 |
|---|---|---|
| WEAK EXPOSURE IMAGE DATA | B1 | B0 |

| | bit5 | bit4 | bit3 | bit2 | bit1 | bit0 |
|---|---|---|---|---|---|---|
| COMPOSITE IMAGE DATA | D3 | D2 | D1 | D0 | B1 | B0 |

IMAGE FORMING APPARATUS

BACKGROUND OF THE INVENTION

Field of the Invention

The present invention relates to an image forming apparatus configured to form an image based on input image data.

Description of the Related Art

Hitherto, in regard to an electrophotographic image forming apparatus, control to cause a light-emitting element of a laser scanner to minutely emit light for a non-image area within a printable area to such an extent as not to cause adhesion of toner is proposed as a measure for solving various problems relating to the image forming apparatus. The non-image area represents an area within the printable area to which toner is not caused to adhere. The control to cause the light-emitting element of the laser scanner to minutely emit light to such an extent as not to cause adhesion of toner is referred to as "background exposure" or "non-image area minute light emission". In contrast to the non-image area, an area within the printable area to which toner is caused to adhere is referred to as "visual image area".

For example, in Japanese Patent Application Laid-Open No. 2003-312050, it is proposed to use the background exposure for the purpose of suppressing a white gap. For example, in an image of a cyan band and a black band that are made adjacent to each other, the cyan band and the black band are normally formed to be adjacent to each other without a gap. However, there is a phenomenon in which toner images in the respective colors are each formed to become thinner and a gap occurs between cyan and black in a final image formed on a recording material. This phenomenon is referred to as "white gap". The thinning of the toner image within the visual image area, which may cause the white gap, is ascribable to an electric field is convoluted in an edge part of an electrostatic latent image formed on a photosensitive drum, and the background exposure is proposed as a method of preventing the thinning of the toner image. Further, in, for example, Japanese Patent Application Laid-Open No. 2013-117622, it is proposed to use the background exposure in order to eliminate nonuniformity in a potential of a photosensitive drum surface to which a charging voltage has been applied. In order to suppress an occurrence of a phenomenon called "sands" due to overcharging during the charging or a phenomenon called "ghost", the background exposure is used to cause the non-image area to have a stable dark portion potential through the background exposure.

As a specific method for the background exposure, in Japanese Patent Application Laid-Open No. 2003-312050, it is proposed to superimpose minute light emission data, which is as small as not to form a toner image and has no correlation, on an input image, and to output the minute light emission data as a video. Further, in Japanese Patent Application Laid-Open No. 2013-117622, the background exposure is conducted by causing a bias current as small as to enable weak light emission to flow through a laser diode within the non-image area.

However, in Japanese Patent Application Laid-Open No. 2003-312050, image data has a pattern for a background exposure superimposed on the image, but the pattern for the background exposure is generated at random. Therefore, there may occur an error between an originally targeted surface potential of the photosensitive drum and an actual surface potential thereof, and the accuracy of a surface potential of the photosensitive drum may deteriorate. Further, in Japanese Patent Application Laid-Open No. 2013-117622, a laser is caused to emit light as small as not to form a toner image, and hence it is necessary to control the bias current with high accuracy. A bias current source of a laser driver configured to control a current flowing through the laser diode of the laser scanner or an APC circuit configured to conduct automatic light intensity control (hereinafter referred to as "APC") requires highly accurate control, which may cause an increase in the size of the APC circuit or an increase in cost. In this manner, a circuit scale increases when the background exposure is conducted by the bias current, while the accuracy of potential control of the photosensitive drum deteriorates when the background exposure is conducted with the image data.

SUMMARY OF THE INVENTION

The present invention has been made under such circumstances, and has an object to conduct a background exposure easily with accuracy.

According to one embodiment of the present invention, there is provided an image forming apparatus configured to form an image based on input image data, including: a photosensitive member; a charging unit configured to charge the photosensitive member; a light irradiating unit configured to irradiate the photosensitive member charged by the charging unit with light; a developing unit configured to develop an electrostatic latent image with toner, the electrostatic latent image being formed on the photosensitive member by the light irradiating unit irradiating the photosensitive member; a processing unit configured to generate M-bit (M is an integer equal to or larger than 2) density data indicating a density based on the input image data, configured to generate (M+N)-bit processing data based on the M-bit density data and N-bit (N is an integer equal to or larger than 1) correction data, configured to convert the (M+N)-bit processing data into a plural-bit binary drive data corresponding to a value of the (M+N)-bit processing data, and configured to serially output the plural-bit binary drive data bit by bit to generate a drive signal; and a drive unit configured to drive the light irradiating unit based on the drive signal generated by the processing unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, a description is made of an embodiment of the present invention applied to a color multifunction peripheral of a four-drum system having four photosensitive drums arranged in tandem.

[Circuit of Laser Diode and its Peripheral Parts]

First, an example of a laser drive circuit included in an optical scanning apparatus is described with reference to FIG. 12. The optical scanning apparatus according to this embodiment includes a laser diode (hereinafter referred to as LD) 1301 serving as a light-emitting portion configured to emit laser light, a photodiode (hereinafter referred to as PD) 1302 serving as a light-receiving portion configured to receive the laser light, and a resistor 1303. The LD 1301 and the PD 1302 are built into, for example, one semiconductor laser chip. The resistor 1303 is an electronic part provided separately from the semiconductor laser chip.

Figure 12:
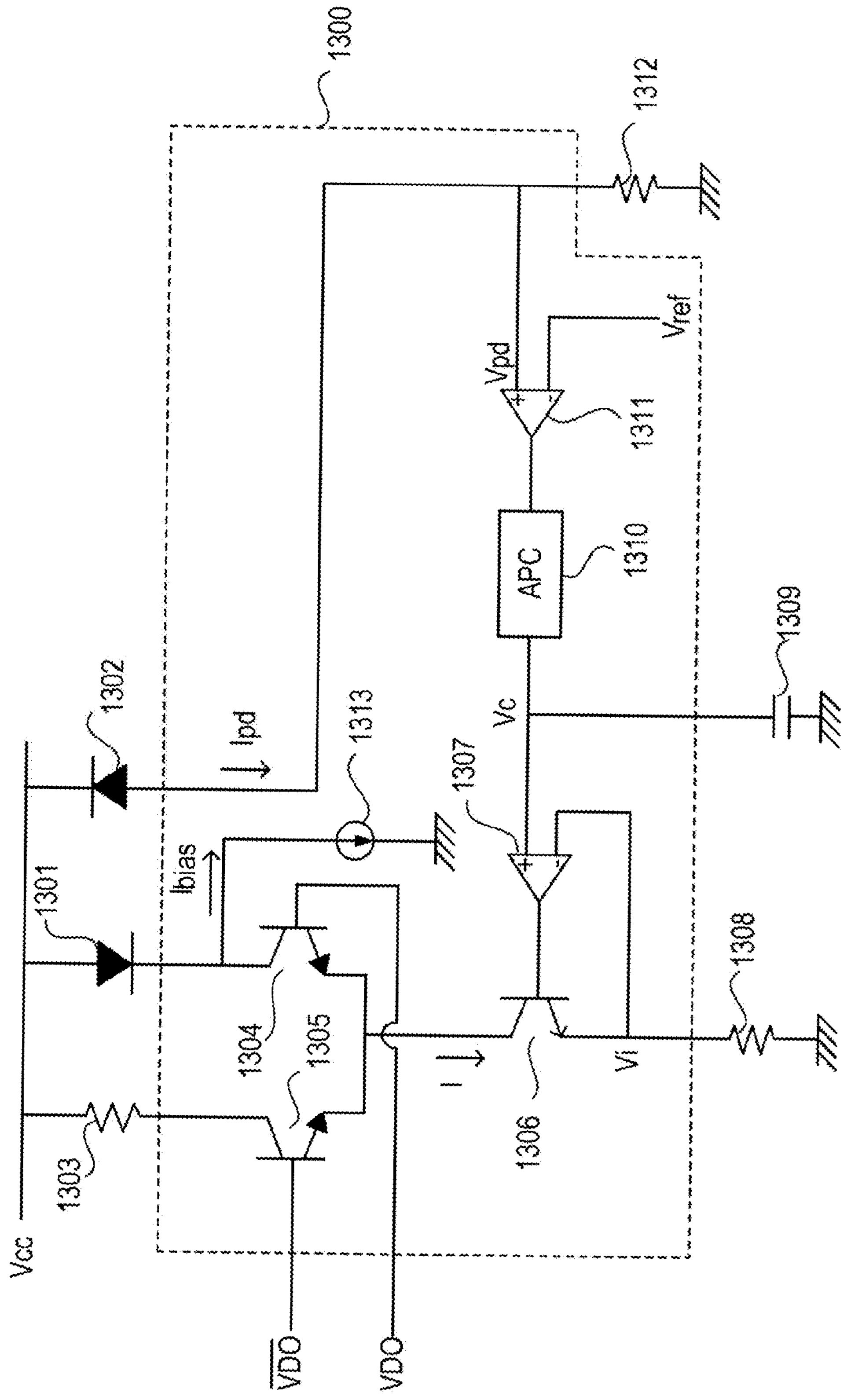
FIG. 12 is a circuit diagram of a laser diode and its peripheral parts.

As illustrated in FIG. 12, the LD 1301 is connected to a collector terminal of a transistor 1304. Meanwhile, the resistor 1303 is connected to a collector terminal of a transistor 1305. A VIDEO signal (VDO signal), which is a pulse width modulation signal (PWM signal) described later, is input to a base terminal of the transistor 1304. Further, a $\overline{\text{VIDEO}}$ signal ($\overline{\text{VDO}}$ signal), which is an inverted signal of the VDO signal, is input to a base terminal of the transistor 1305. An emitter terminal of the transistor 1304 and an emitter terminal of the transistor 1305 are connected to each other.

A bias current source 1313 is connected between a cathode terminal of the LD 1301 and the collector terminal of the transistor 1304. The bias current source 1313 is a current source configured to draw a constant bias current Ibias. The optical scanning apparatus according to this embodiment may employ a circuit configuration involving a bias current Ibias having a variable value.

In the above-mentioned circuit configuration, when the VDO signal is at a "High" level, the transistor 1304 is turned on, and hence a current including a current I and the bias current Ibias flows through the LD 1301. When the VDO signal is at the "High" level, the $\overline{\text{VDO}}$ signal is "Low", while the transistor 1305 is turned off, and hence a current does not flow through the resistor 1303.

Meanwhile, when the VDO signal is at a "Low" level, the transistor 1304 is turned off, and hence the bias current Ibias flows through the LD 1301, and the current I does not flow through the LD 1301. When the VDO signal is at the "Low" level, the $\overline{\text{VDO}}$ signal is "High", while the transistor 1305 is turned on, and hence the current I flows through the resistor 1303. When only the bias current Ibias flows through the LD 1301, an intensity of light emitted from the LD 1301 is extremely small, and is not such a light intensity as to change a potential of a surface of a photosensitive drum.

Whichever of the "High" level and the "Low" level the VDO signal is at, the current I flows to the ground through a constant current circuit formed of a transistor 1306, a comparator 1307, and a resistor 1308.

The PD 1302 receives the laser light emitted from the LD 1301, and generates a current Ipd corresponding to the light intensity of the received light. The value of the current Ipd is converted into a voltage Vpd by a resistor 1312. The voltage Vpd is input to a non-inverting terminal of a comparator 1311. A comparison voltage Vref corresponding to a current value corresponding to a target light intensity on the photosensitive drum is input to an inverting terminal of the comparator 1311. In FIG. 12, the comparison voltage Vref is generated within a laser driver 1300, but may be input from the outside.

An APC circuit 1310 is configured to charge and discharge a capacitor 1309 based on a comparison result from the comparator 1311. That is, when Vref>Vpd, the APC circuit 1310 charges the capacitor 1309. When Vref<Vpd, the APC circuit 1310 discharges the capacitor 1309. When Vref=Vpd, the APC circuit 1310 maintains a voltage of the capacitor 1309. Controlling the light intensity of the laser light emitted from the LD 1301 at the target light intensity by controlling the voltage of the capacitor 1309 is referred to as APC (automatic power control).

The capacitor 1309 is connected to a non-inverting terminal of the comparator 1307 of the constant current circuit. That is, a potential of the non-inverting terminal of the comparator 1307 is defined by a voltage Vc of the capacitor 1309. Meanwhile, a voltage Vi corresponding to the current I is input to an inverting terminal of the comparator 1307. That is, the current I is converted into the voltage Vi by the resistor 1308. As illustrated in FIG. 12, a voltage of the inverting terminal of the comparator 1307 becomes Vi. The comparator 1307 controls a base voltage of the transistor 1306 so that the voltage Vi of the inverting terminal becomes Vc.

First Embodiment

[Color Multifunction Peripheral]

Figure 1:
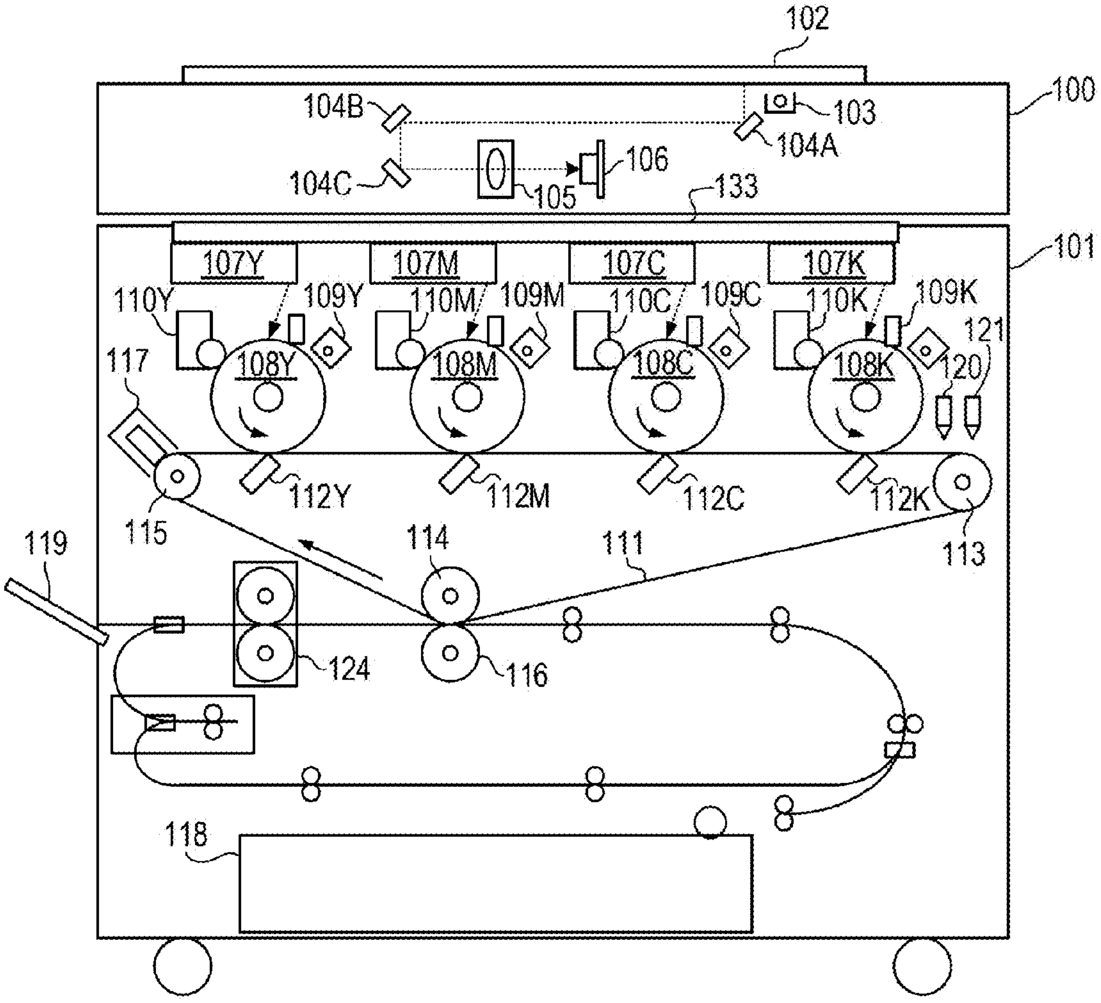
FIG. 1 is a schematic block diagram of an entire color image forming apparatus according to first and second embodiments of the present invention.

FIG. 1 is a schematic block diagram of an entire color multifunction peripheral according to a first embodiment of the present invention. First, outlines of a color image reading apparatus (hereinafter referred to as a color scanner) 100 and a color image forming apparatus (hereinafter referred to as a color printer) 101, which form the color multifunction peripheral, are described with reference to FIG. 1. The color scanner 100 is configured to conduct imaging for an image of an original 102 on a color sensor 106 via an illumination lamp 103, a group of mirrors 104A, 104B, and 104C, and a lens 105, and to convert color image information on the original 102 into color image data being an electrical image signal. The color image data is output to a central image processing section 133. The central image processing section 133 can transmit and receive input data not only to/from the color scanner 100 but also to/from the outside, e.g., a telephone line or a network, through an external interface illustrated in FIG. 2A. When the received data is described in a page description language (PDL), the data can also be expanded into image information by a PDL processing portion (not shown) to obtain the color image data.

Next, an outline of the color printer 101 of FIG. 1 is described. In the color printer 101, the color image data transmitted from the color scanner 100 is converted into optical signals by laser scanner units 107Y, 107M, 107C, and 107K provided for toner of respective colors on a one-to-one basis to serve as light irradiating units. In this case, the suffix "Y" indicates that the corresponding component is used for yellow, "M" indicates that the corresponding component is used for magenta, "C" indicates that the corresponding component is used for cyan, and "K" indicates that the corresponding component is used for black. The suffixes "Y", "M", "C", and "K" are omitted except for a case of describing a specific color. The laser scanner unit 107 is configured to convert the color image data into an optical signal, and to conduct optical writing corresponding to an original image to form an electrostatic latent image on a photosensitive drum 108 provided for each color.

The photosensitive drum 108 is configured to rotate in a direction indicated by the arrow within FIG. 1 (counterclockwise direction). A charging device 109 serving as a charging unit and a developing device 110 serving as a developing unit, which are provided for each color, are arranged around the photosensitive drum 108 serving as a photosensitive member. The color printer 101 further includes an intermediate transfer belt 111 serving as an intermediate transfer member and a transfer blade 112 serving as a first transfer unit for each color. The intermediate transfer belt 111 is looped around a drive roller 113 configured to drive the intermediate transfer belt 111 by a drive motor (not shown) and driven rollers 114 and 115. In order to develop the electrostatic latent image, the developing device 110 for each color includes a developing sleeve configured to rotate for bringing a developer into contact with a surface of the photosensitive drum 108 and a developing paddle configured to rotate for pumping and agitating the developer.

Further, a transfer roller 116 serving as a second transfer unit is arranged at such a position as to be opposed to the driven roller 114 of the intermediate transfer belt 111, and is provided with a contact-separation mechanism for driving the transfer roller 116 between a state of being abutted with the intermediate transfer belt 111 and a state of being spaced apart from the intermediate transfer belt 111 so as to be separably brought into contact with the intermediate transfer belt 111. Further, a belt cleaning unit 117 is provided on a surface of the intermediate transfer belt 111 at such a predetermined position as to be opposed to the driven roller 115. The belt cleaning unit 117 is also provided with a contact-separation mechanism for driving the belt cleaning unit 117 so as to be separably brought into contact with the intermediate transfer belt 111, and timings for the contact and separation of the belt cleaning unit 117 are as follows. That is, the belt cleaning unit 117 is kept apart from the surface of the intermediate transfer belt 111 during a period from the start of printing until a trailing edge part of an image of the last color in a rotational direction of the intermediate transfer belt 111 finishes being transferred onto the intermediate transfer belt 111. Then, at a predetermined timing after that, the belt cleaning unit 117 is brought into contact with the surface of the intermediate transfer belt 111 by the contact-separation mechanism (not shown), and cleaning is conducted by the belt cleaning unit 117.

In the color printer 101, image formation for yellow is started first. After that, image formation for magenta is started at a timing delayed by an interval between the photosensitive drum 108Y and the photosensitive drum 108M with respect to the rotation speed of the intermediate transfer belt 111. Subsequently, image formation for cyan is started at a timing delayed by an interval between the photosensitive drum 108M and the photosensitive drum 108C with respect to the rotation speed of the intermediate transfer belt 111. Subsequently, image formation for black is started at a timing delayed by an interval between the photosensitive drum 108C and the photosensitive drum 108K with respect to the rotation speed of the intermediate transfer belt 111.

The respective colors of the image data in the PDL or the like or the color image data transmitted from the color scanner 100 are processed by the central image processing section 133, and stored in a RAM 204 illustrated in FIG. 2A serving as a storage unit described later. The photosensitive drums 108 for the respective colors are uniformly charged by the charging devices 109 in order. The central image processing section 133 reads the image data stored in the RAM 204. With reference to a predetermined timing, the central image processing section 133 causes the laser scanner units 107 to conduct the optical writing using the laser light for the photosensitive drums 108 based on the read image data, and to start forming electrostatic latent images on the photosensitive drums 108 in order. The image formation for yellow is described below as a representative example of the four drums.

When a laser exposure on the photosensitive drum 108Y is started by the laser scanner unit 107Y, the developing sleeve of the developing device 110Y is caused to rotate in order to conduct development from a leading edge part of an electrostatic latent image in yellow (hereinafter referred to as a Y latent image) in the rotational direction of the photosensitive drum 108Y. Further, a developing voltage is applied to the developing sleeve of the developing device 110Y. After that, the developing device 110Y continues a developing operation for the Y latent image formed on the photosensitive drum 108Y. At a timing at which a trailing edge part of the Y latent image in the rotational direction of the photosensitive drum 108Y passes through a developing position of the developing device 110Y, the developing device 110Y is brought into a state in which the developing operation is no longer conducted (developing operation disabled state). The toner image in yellow (hereinafter referred to also as the first image) formed on the photosensitive drum 108Y is transferred onto the intermediate transfer belt 111 by the intermediate transfer belt 111 and the transfer blade 112Y, and held on the intermediate transfer belt 111.

The above-mentioned series of operations is conducted for the respective other units for magenta, cyan, and black in order, and the first images in the respective colors are superimposed on one another and transferred onto the intermediate transfer belt 111 by the transfer blade 112, to thereby form a full-color toner image on the intermediate transfer belt 111. A transfer sheet conveyed from a sheet feeding stage 118 configured to receive transfer sheets is supplied to the transfer roller 116 at a timing suitable for both a leading edge of the toner image transferred onto the intermediate transfer belt 111 and a leading edge of the transfer sheet, and the toner image transferred onto the intermediate transfer belt 111 is transferred onto the transfer sheet. In this case, the leading edge of the toner image transferred onto the intermediate transfer belt 111 represents the leading edge of the toner image transferred onto the intermediate transfer belt 111 in the rotational direction of the intermediate transfer belt 111. Further, the leading edge of the transfer sheet represents the leading edge of the transfer sheet in a conveyance direction of the transfer sheet. The transfer sheet subjected to the transfer of the toner image is separated from the transfer roller 116, and conveyed to a fixing portion 124, and the unfixed toner on the transfer sheet is fixed. The transfer sheet subjected to fixation processing is delivered onto a tray 119.

The color printer 101 includes a registration sensor 120 in order to correct misregistration, namely, color misregistration, of the respective color images formed on the respective photosensitive drums 108. In addition, in the color printer 101, a density sensor 121 configured to measure a patch density at a time of density control is arranged in the vicinity of the registration sensor 120. When the density control is conducted, the measurement of the density of each patch is conducted by the density sensor 121. The registration sensor 120 and the density sensor 121 are configured to measure the unfixed toner image formed on the intermediate transfer belt 111.

[Central Image Processing Section]

Figure 2A:
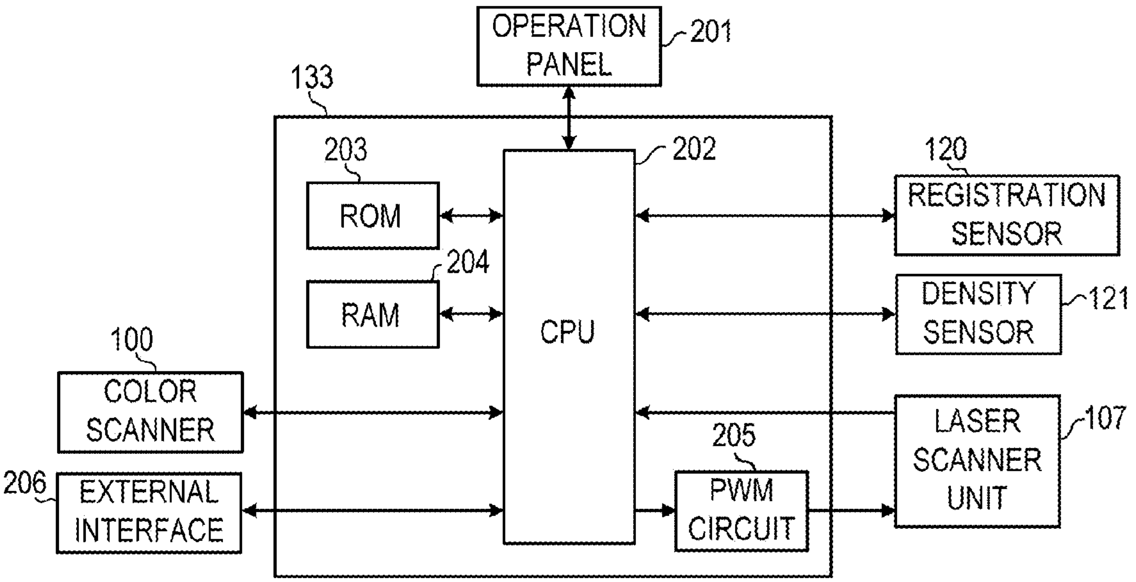
FIG. 2A is a block diagram of a central image processing section according to the first and second embodiments.

FIG. 2A is a block diagram of the central image processing section 133. An operation panel 201 is an interface portion with respect to a user, and is configured to receive an operation from the user, and to display a message for the user. An external interface 206 is configured to receive image data from an external information apparatus through a circuit such as a network, a radio link, and a telephone line. A CPU 202 is connected to the operation panel 201, a ROM 203, the RAM 204, a PWM circuit 205, the registration sensor 120, the density sensor 121, and the laser scanner unit 107. The CPU 202 is configured to control those components, to process the image data input from the color scanner 100 or the external interface 206, and to generate a weak exposure image (referred to also as a dot dispersion image) for a weak exposure. The PWM circuit 205 may be built into the CPU 202, or the color printer 101 may include an ASIC having both a part of functions executed by the CPU 202 and a function executed by the PWM circuit 205 separately from the CPU 202.

The ROM 203 is configured to store a program to be operated on the CPU 202. The RAM 204 is configured to store the image data input from the color scanner 100 or the external interface 206, weak exposure image data (correction data) for a weak exposure, output image data (processing data) obtained by subjecting those pieces of data to compositing processing, and the like in order to conduct image processing on the CPU 202. The PWM circuit 205 is configured to convert the output image data processed by the CPU 202 into a pulse signal (PWM signal, or VDO signal and $\overline{\text{VDO}}$ signal) being a drive signal for driving a laser illustrated in FIG. 12. The PWM circuit 205 is connected to the laser scanner units 107 for the four colors in actuality, but those are collectively illustrated as the laser scanner unit 107 in FIG. 2A.

[Laser Scanner Unit]

Figure 2B:
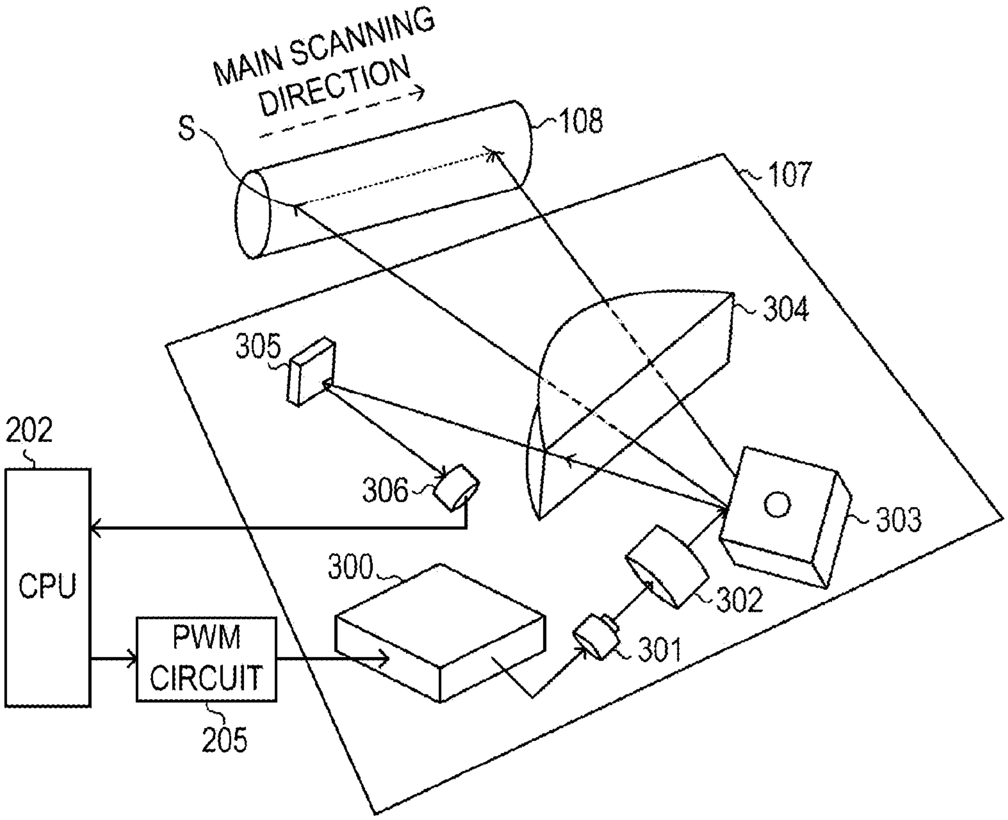
FIG. 2B is a schematic diagram of a laser scanner unit.

The laser scanner unit 107 is described with reference to a schematic diagram of the laser scanner unit 107 illustrated in FIG. 2B. A laser driver 300 serving as a drive unit is configured to supply a drive current I to a one-beam laser diode 301 (hereinafter referred to as an LD 301) including a light-emitting element (light-emitting portion) based on the drive signal generated by the central image processing section 133 serving as a processing unit based on the image data. The drive signal is a PWM signal including a pulse. When the central image processing section 133 outputs the pulse (on signal) to the laser driver 300, the laser driver 300 supplies a drive current to the LD 301 based on the on signal. With the supply of the drive current, the LD 301 emits laser light having such a light intensity as to change the surface potential of the photosensitive drum. Meanwhile, when the central image processing section 133 does not output the pulse to the laser driver 300 (outputs an off signal), the laser driver 300 is inhibited from supplying the drive current to the LD 301 based on the off signal. The laser light emitted from the LD 301 is caused to have a beam shaped and collimated by a collimator lens 302, and is then reflected and deflected by a rotary polygonal mirror 303 that is rotating. The deflected laser light is transmitted through an fθ lens 304, and imaged on the surface of the photosensitive drum 108 that is rotating, to thereby become a dot-shaped spot. Then, the laser light that has become the dot-shaped spot is moved (scanned) in a main scanning direction (direction parallel with a rotation axis direction of the photosensitive drum 108) indicated by the dotted arrow in FIG. 2B, to thereby form a scanning line and expose the photosensitive drum 108.

Meanwhile, a reflective mirror 305 is provided at a position at which the laser light enters on an upstream side of a scanning starting position S of a scanning line on the photosensitive drum 108 in the main scanning direction. The laser light that has entered the reflective mirror 305 enters a beam detector (hereinafter referred to as BD) 306. The BD 306 is configured to detect that the laser light has entered, and to output a pulse signal (hereinafter referred to as a BD signal) to the CPU 202. The CPU 202 outputs the VDO signal and the $\overline{\text{VDO}}$ signal based on the BD signal input from the BD 306. Further, the above-mentioned automatic light intensity control (hereinafter referred to as an APC control) for controlling the light intensity of the LD 301 is conducted after the photosensitive drum 108 is scanned and before the photosensitive drum 108 is scanned next. When the APC control is conducted, a light emission intensity (light emission level) of the LD 301 is adjusted for the next scanning of the laser light. The LD 301 corresponds to the LD 1301 of FIG. 12, the laser driver 300 corresponds to the laser driver 1300 of FIG. 12, and the PWM circuit 205 outputs the VDO signal and the $\overline{\text{VDO}}$ signal illustrated in FIG. 12.

During the image formation, the central image processing section 133 emits light to an image area within an image formation enabled area (effective area of the photosensitive drum 108) of the surface of the photosensitive drum 108 based on the image data with such a light emission intensity as to cause adhesion of toner (hereinafter referred to also as a printing light emission intensity). Light emission conducted based on the image data with the printing light emission intensity is hereinafter referred to as a normal light emission. In addition, a minute light emission is conducted for a non-image area within the image formation enabled area of the surface of the photosensitive drum 108 based on such image data as to cause a minute light emission with such a minute light emission intensity as not to cause adhesion of toner.

[Transfer Ghost and Minute Light Emission]

(Occurrence Principle of Transfer Ghost)

Figure 3A:
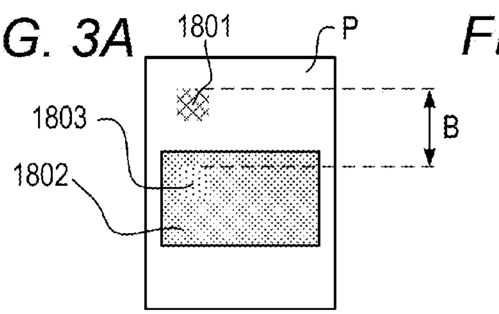
FIG. 3A and FIG. 3B are diagrams for illustrating an occurrence principle of a transfer ghost according to the first and second embodiments.

Now, in regard to elimination of a phenomenon called "transfer ghost", which is an object of conducting the minute light emission according to this embodiment, descriptions are made of an occurrence principle of a transfer ghost and an effect of the minute light emission. The occurrence principle of the transfer ghost is described with reference to FIG. 3A to FIG. 3K. FIG. 3A is an illustration of a transfer sheet P on which a transfer ghost has occurred. A red image 1801 formed of Y toner and M toner exists on the transfer sheet P. The red image 1801 is a toner image which is obtained by applying the M toner onto the Y toner and which has a large applied amount of toner. In addition, a uniformly black halftone image 1802 exists at a backward position of the red image 1801 in a sub-scanning direction A. In this case, there occurs a phenomenon in which a black halftone image 1803 existing in a part spaced apart backward from the red image 1801 in the sub-scanning direction A by a distance B, which corresponds to one revolution about a perimeter of the photosensitive drum 108 (hereinafter referred to as one drum revolution), exhibits a low density in the shape of the red image 1801. This phenomenon is referred to as a transfer ghost.

Figure 3B:
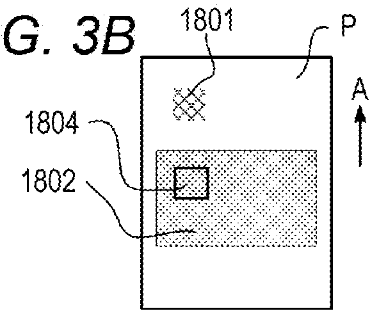
Figure 3C:
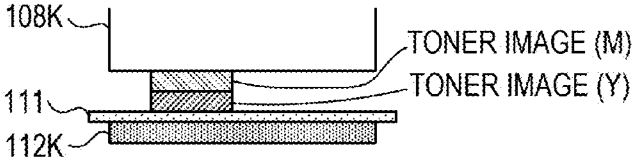
FIG. 3C, FIG. 3D, FIG. 3E, FIG. 3F, FIG. 3G, FIG. 3H, FIG. 3I, FIG. 3J, and FIG. 3K are explanatory diagrams of a potential of a photosensitive drum surface.
Figure 3D:
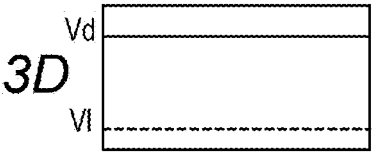
Figure 3H:
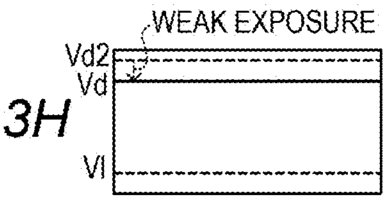
Figure 3E:
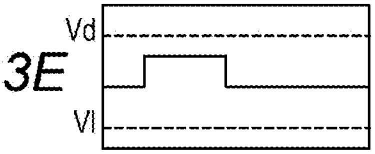

The occurrence principle of the transfer ghost is described with reference to FIG. 3C to FIG. 3G. FIG. 3C is an enlarged diagram of a transfer position in the vicinity of the photosensitive drum 108K for black and the intermediate transfer belt 111. Further, the enlarged diagram indicates a state at a time at which toner images in Y and M forming the red image 1801 of FIG. 3A reach the transfer position for black. FIG. 3D is a diagram for illustrating the surface potential of the photosensitive drum 108K exhibited before the red image 1801 passes through a nip portion of the photosensitive drum 108K. The nip portion of the photosensitive drum 108K is formed by bringing the photosensitive drum 108K and the transfer blade 112K into abutment with each other. At this time, the surface of the photosensitive drum 108K is uniformly charged to Vd by the charging device 109K. The potential of the surface of the photosensitive drum 108K is hereinafter referred to as a surface potential of the photosensitive drum 108K. FIG. 3E is a diagram for illustrating the surface potential of the photosensitive drum 108K exhibited after the red image 1801 on the intermediate transfer belt 111 passes through the nip portion of the photosensitive drum 108K. A part through which the red image 1801 has passed exhibits a high resistance value by a value corresponding to the existence of the Y toner and the M toner. Therefore, a current flowing between the transfer blade 112K and the photosensitive drum 108K decreases. For that reason, the surface potential of the photosensitive drum 108K differs only in the part of the red image 1801.

Figure 3I:
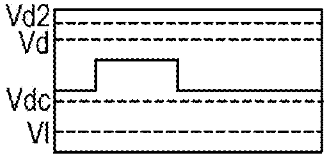
Figure 3F:
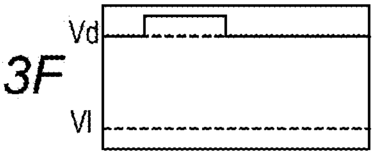
Figure 3J:
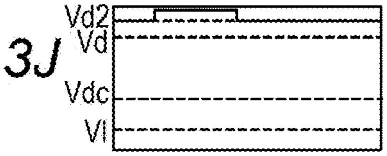
Figure 3G:
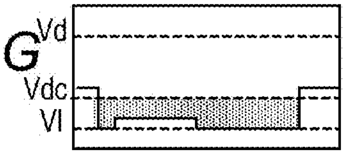

FIG. 3F is a diagram for illustrating the surface potential of the photosensitive drum 108K exhibited after the state of FIG. 3E is reached and the photosensitive drum 108K is charged by the charging device 109K. The potential of the photosensitive drum 108K in the part through which the red image 1801 on the intermediate transfer belt 111 has not passed becomes Vd, but the potential of the photosensitive drum 108K in the part through which the red image 1801 has passed becomes a potential different from Vd through the charging. FIG. 3G is a diagram for illustrating the surface potential of the photosensitive drum 108K exhibited after the photosensitive drum 108K is exposed by the laser scanner unit 107K under the state of FIG. 3F in order to form a latent image of the black halftone image 1802. The exposure causes the surface potential of the photosensitive drum 108K to become Vl in the part through which the red image 1801 has not passed. However, in the part through which the red image 1801 has passed, which exhibits a potential different from Vd before the exposure, a potential due to an influence thereof (referred to also as a residual potential) remains, and the surface potential of the photosensitive drum 108K does not become Vl. Therefore, the potential of the photosensitive drum 108K is different from Vl only in the part through which the red image 1801 has passed, and a potential difference from a potential Vdc that causes toner to start being applied at a time of development becomes smaller. The potential Vdc is a developing voltage. In this manner, the potential difference between the surface potential of the photosensitive drum 108K due to the exposure and the potential Vdc that causes the toner to start being applied becomes smaller, to thereby decrease the amount applied to the photosensitive drum 108K for K toner. As a result, in the same manner as the red image 1801, the black halftone image 1803 becomes lighter. The occurrence principle of the transfer ghost has been described above.

(Alleviation of Transfer Ghost Through Use of Background Exposure)

Next, a description is made of a principle of alleviation of a transfer ghost through use of a background exposure. FIG. 3H to FIG. 3K are diagrams for illustrating a transition of the surface potential of the photosensitive drum 108K according to this embodiment. FIG. 3H is an illustration of the surface potential of the photosensitive drum 108K exhibited before the red image 1801 passes through the nip portion. The surface of the photosensitive drum 108K is once charged to a potential Vd2 (≠Vd) by the charging device 109K, but becomes Vd through the weak exposure conducted by the laser scanner unit 107. FIG. 3I is an illustration of the surface potential of the photosensitive drum 108K exhibited after the red image 1801 passes through the nip portion, and is the same as FIG. 3E. FIG. 3J is an illustration of the surface potential exhibited after the surface of the photosensitive drum 108K is charged by the charging device 109K. In FIG. 3J, compared with FIG. 3F, the surface of the photosensitive drum 108 is charged to the potential Vd2 higher than the potential Vd by the charging device 109K, and thus the residual potential due to the red image 1801 is alleviated to a lower level than when the surface of the photosensitive drum 108 is charged to the potential Vd.

Figure 3K:
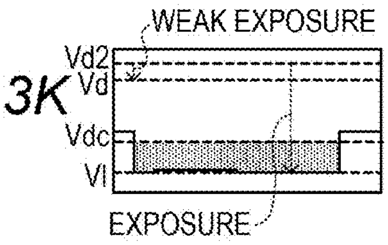

FIG. 3K is an illustration of the surface potential of the photosensitive drum 108K exhibited after the black halftone image 1802 is exposed. In order to form the black halftone image 1802 on the transfer sheet P, the photosensitive drum 108K is exposed by the laser scanner unit 107K. In regard to the light intensity of the laser light used at that time, the light intensity of the LD 301 needs to be raised to a higher level than in the example of FIG. 3G in which the transfer ghost occurs because the potential Vd2 is lowered to the potential Vl by the charging device 109K. Further, because the potential Vd2 is lowered to the potential Vl after the exposure by the charging device 109K, the residual potential due to the red image 1801 becomes lower, and the transfer ghost is alleviated. As a result, as illustrated in FIG. 3B, it is possible to obtain an image 1804 with the transfer ghost being alleviated compared with FIG. 3A. The description of this embodiment is directed to the background exposure that aims at the effect of the alleviation of the transfer ghost, but this embodiment is not intended to impose any limitations on the effect of the background exposure.

[Image Forming Processing for Conducting Weak Exposure]

Figure 4:
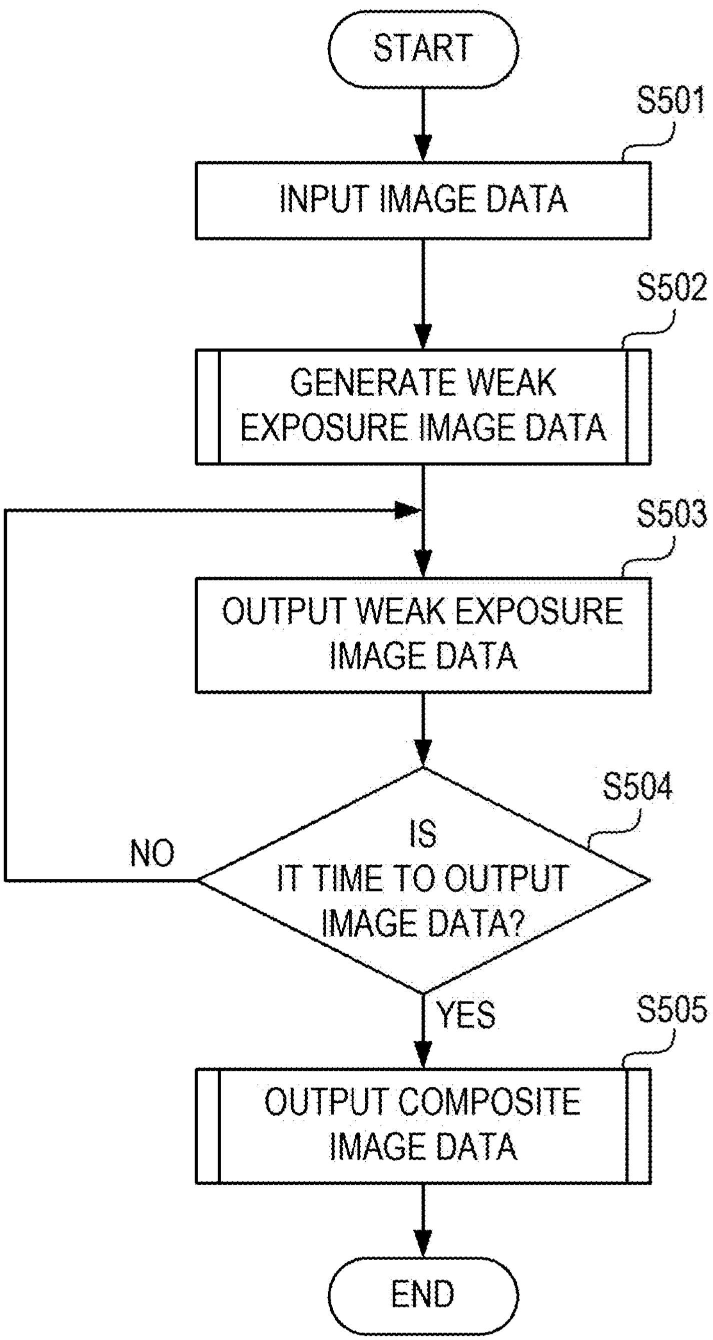
FIG. 4 is a flowchart for illustrating image forming processing according to the first and second embodiments.

Now, a description is made of image forming processing for conducting a weak exposure according to this embodiment. FIG. 4 is a flowchart for illustrating processing for the entire image forming operation to be executed by the CPU 202. The program for executing the flowchart of FIG. 4 is stored in the ROM 203. In Step (hereinafter referred to as "S") 501, namely, in S501, the CPU 202 receives an input of image data from the external interface 206 or the color scanner 100, and stores the input image data in an area (hereinafter referred to as an input image area) within the RAM 204 for storing the image data (density data). In this embodiment, the density of each pixel in, for example, 600 dpi is assumed to be expressed by 4 bits (M bits).

In S502, the CPU 202 generates image data (in FIG. 4, referred to as a weak exposure image data) for conducting the weak exposure by the laser scanner unit 107, and stores the weak exposure image data in an area (hereinafter referred to as a weak exposure image area) within the RAM 204 for storing the weak exposure image data. Details of weak exposure image data generating processing of S502 are described later. In this case, the weak exposure image data is assumed to have a size of X pixels in the main scanning direction and Y pixels in the sub-scanning direction. It is assumed that X is a length (hereinafter referred to as a main scanning width) along the main scanning direction by which the exposure can be conducted for the photosensitive drum 108, and that Y is substantially the same as a length of the largest sheet of the transfer sheet P being a printing target along a longitudinal direction (sub-scanning direction). For example, in this embodiment, X is set to 7,016 pixels in 600 dpi, and Y is set to 9,922 pixels in 600 dpi for an A3-size sheet. Further, one pixel corresponds to data of 4 bits (16-step gradation).

In S503, the CPU 202 starts an output of the image data for conducting the weak exposure by the laser scanner unit 107 (hereinafter referred to as a weak exposure image output). In order to allow laser light emission to be started at the scanning starting position S illustrated in FIG. 2B within an effective image area of the photosensitive drum 108 in the main scanning direction with reference to the BD signal output from the BD 306 of the laser scanner unit 107, the CPU 202 conducts the weak exposure image output in the following manner. That is, the CPU 202 reads the weak exposure image data stored in the weak exposure image area within the RAM 204 pixel by pixel by the pixels (7,016 pixels) along the main scanning direction, and forwards the weak exposure image data to the PWM circuit 205. The CPU 202 advances a pixel line of the weak exposure image data by one line in the sub-scanning direction for each BD signal output from the BD 306. When determining that the pixel line of the weak exposure image data has reached the last line (9,922nd line), the CPU 202 returns to the first line to repeat the above-mentioned processing from the head in the sub-scanning direction. That is, the CPU 202 operates so as to keep repeatedly outputting the same weak exposure image data in the sub-scanning direction. The operation of the PWM circuit 205 is described later in detail.

In S504, the CPU 202 determines whether or not the time to output the image data has been reached. That is, the CPU 202 determines whether or not the time to output the image data has been reached for each BD signal input from the BD 306. The output of the image data referred to in this case represents an image to be applied to the transfer sheet P, that is, an image to be obtained by developing the latent image formed on the photosensitive drum 108 with toner, and represents the image data input in S501. When determining in S504 that the time to output the image data has not been reached, the CPU 202 continues the weak exposure image output of S503. When determining in S504 that the time to output the image data has been reached, the CPU 202 outputs composite image data in S505.

(Composite Image Output Processing)

Figure 5A:
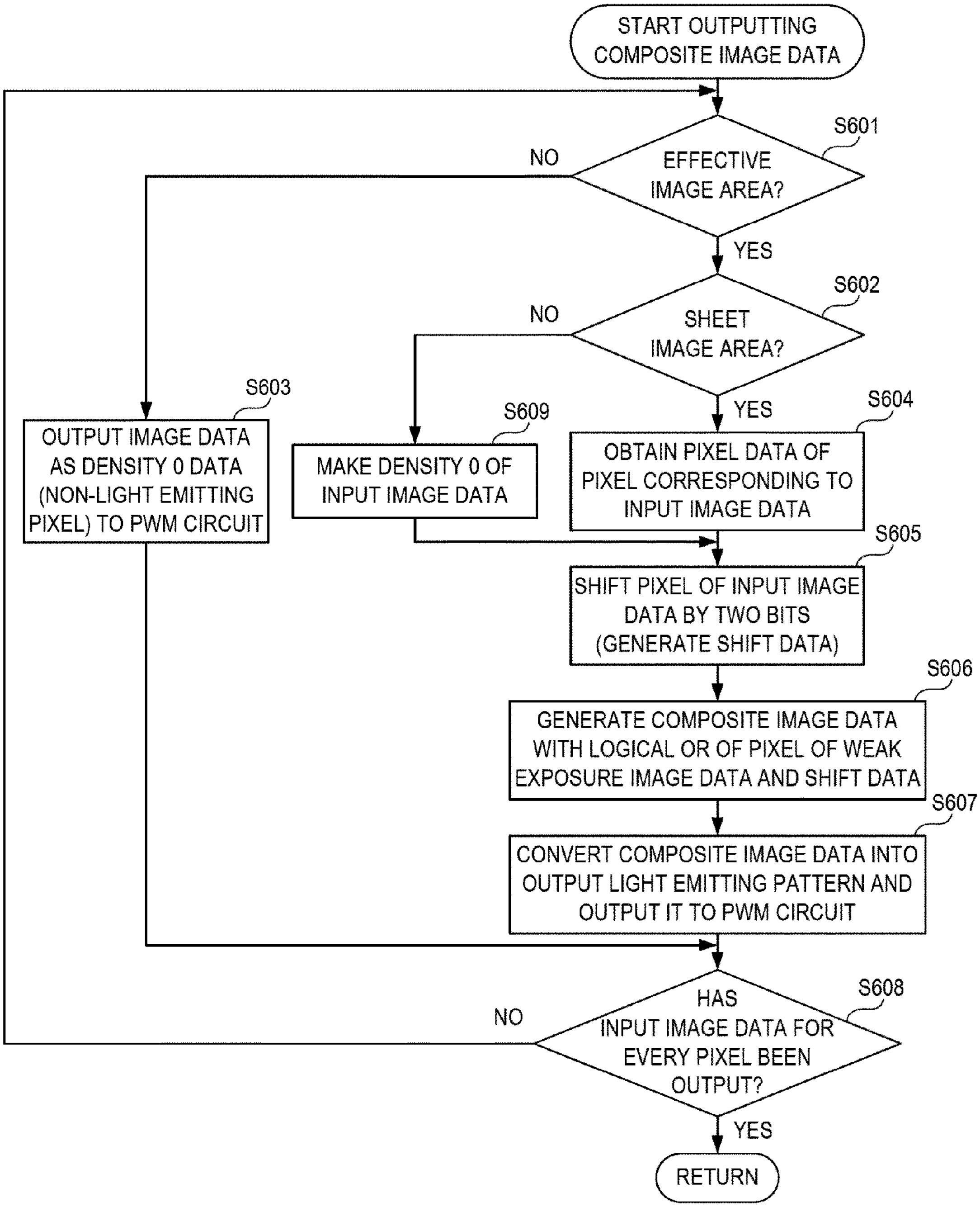
FIG. 5A is a flowchart for illustrating composite image output processing according to the first and second embodiments.
Figure 5B:
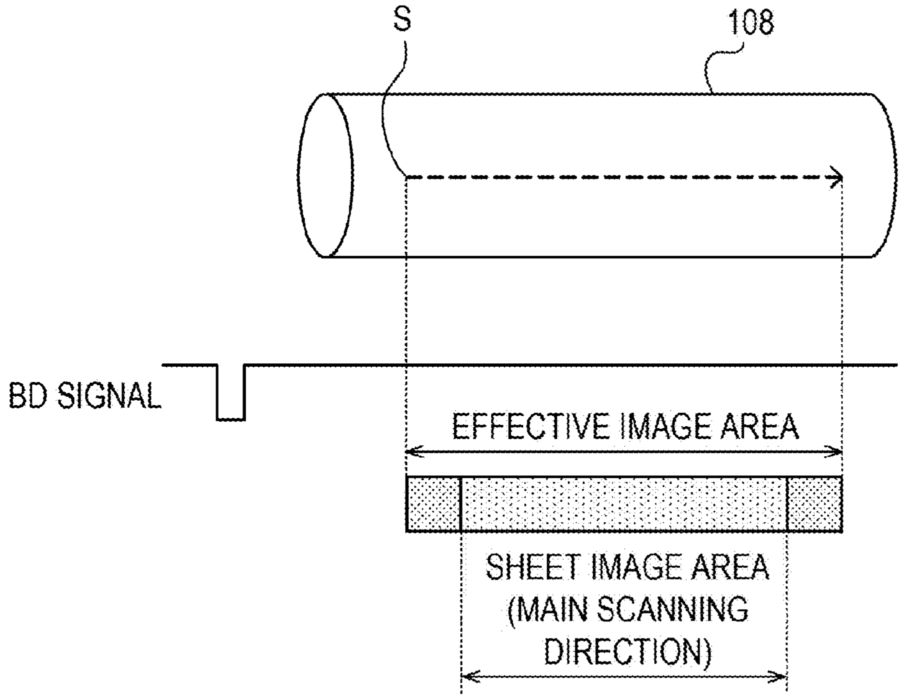
FIG. 5B is a diagram for illustrating an effective image area and a sheet image area.

Processing for outputting the composite image data, which is conducted by the CPU 202 serving as a compositing unit in S505, is described with reference to the flowchart illustrated in FIG. 5A. In S601, the CPU 202 determines whether or not the image data falls within the effective image area of the photosensitive drum 108. In this case, the effective image area of the photosensitive drum 108 represents an area on the photosensitive drum 108 that can be exposed to form a latent image. FIG. 5B is a diagram for illustrating the photosensitive drum 108 and the BD signal output from the BD 306, and the horizontal direction of FIG. 5B corresponds to the main scanning direction. The area on the photosensitive drum 108 that can be scanned by the laser light (hereinafter referred to as a scannable area) corresponds to a predetermined time period defined with reference to the BD signal. The CPU 202 measures the time period with a timer (not shown) with reference to the BD signal, to thereby determine whether or not the image data falls within the effective image area on the photosensitive drum 108 based on the measured time period.

When determining in S601 that the image data falls within the effective image area of the photosensitive drum 108, the CPU 202 advances to the processing of S602, and when determining that the image data does not fall within the effective image area of the photosensitive drum 108, that is, falls out of the effective image area, the CPU 202 advances to the processing of S603. In S602, the CPU 202 determines whether or not the image data falls within a sheet image area of the photosensitive drum 108. In this case, the sheet image area of the photosensitive drum 108 represents a range for outputting the image to be printed on the transfer sheet P, and is described with reference to FIG. 5B. The sheet image area of the photosensitive drum 108 corresponds to the predetermined time period defined with reference to the BD signal output from the BD 306. Further, the sheet image area of the photosensitive drum 108 is an area having a size the same as the size of the effective image area or smaller than the size of the effective image area, and differs depending on the size of the image to be output. When determining in S602 that the image data falls within the sheet image area, the CPU 202 advances to the processing of S604, and when determining that the image data does not fall within the sheet image area, that is, falls out of the sheet image area, the CPU 202 advances to the processing of S609.

Figure 6A:
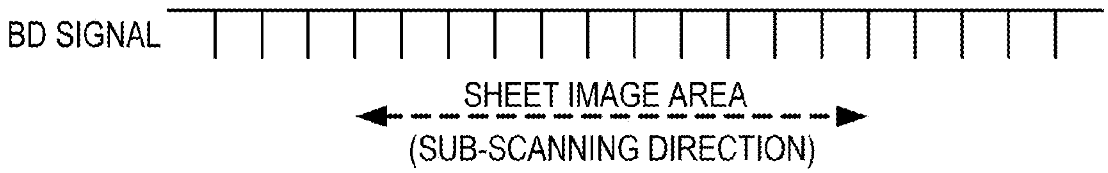
FIG. 6A is a diagram for illustrating a BD signal and the sheet image area according to the first and second embodiments.

In S604, the CPU 202 acquires image data (hereinafter referred to also as a pixel data) of a pixel corresponding to an input image. The corresponding pixel is described with reference to FIG. 6A. FIG. 6A is a timing chart for illustrating a range of the sheet image area along the sub-scanning direction with reference to the BD signal output from the BD 306. A time to write each color in the sub-scanning direction is determined based on a timing that allows each color at the head of the sheet image area to be output to a predetermined position of the sheet without color misregistration. Further, the length of the sheet image area along the sub-scanning direction corresponds to the size of the image of the printing target. Therefore, a coordinate of the corresponding pixel in the sub-scanning direction is determined by the number of times that the BD signal to be scanned currently has been input since the head of the sheet image area. Further, as illustrated in FIG. 5B, a coordinate of the corresponding pixel along the main scanning direction is determined based on a time period from a time to output the BD signal. In this manner, the CPU 202 extracts the pixel data at the coordinates of the corresponding pixel from the input image area on the RAM 204.

Figure 6B:
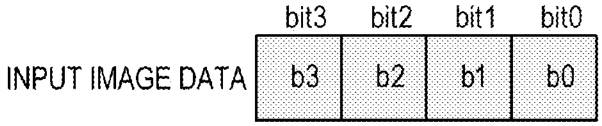
FIG. 6B and FIG. 6C are diagrams for illustrating shift data.
Figure 6C:
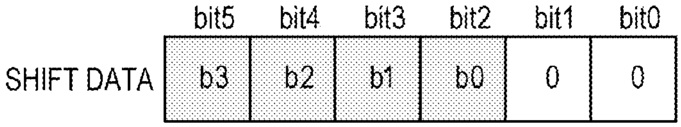

In S605, the CPU 202 shifts pixel data of the pixel corresponding to the input image acquired in S604 by 2 bits (predetermined bits), to thereby generate shift data being the above-mentioned output image data (processing data). FIG. 6B is a diagram for illustrating the pixel data of the pixel corresponding to the input image acquired in S604, and FIG. 6C is a diagram for illustrating a state exhibited after the pixel data is shifted by 2 bits in S605. The pixel data of the input image is the 4-bit data, and bit0, bit1, bit2, and bit3 store pieces of data, namely, "b0", "b1", "b2", and "b3", respectively. The 4-bit data is shifted by 2 bits (shifted by N bits), and data "0" is stored in the low-order 2 bits (low-order bits), to thereby obtain 6-bit ((M+N)-bit) data (bit0 to bit5). The 6-bit data generated by the CPU 202 in S605 is set as the shift data. In the shift data of the input image data of FIG. 6B, bit0, bit1, bit2, bit3, bit4, and bit5 store pieces of data, namely, 0, 0, "b0", "b1", "b2", and "b3", respectively.

Figure 6D:
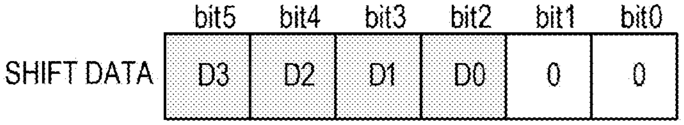
FIG. 6D, FIG. 6E, and FIG. 6F are diagrams for illustrating a composite image.
Figure 6E:
Figure 6F:
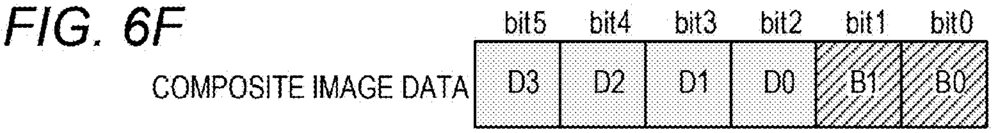

In S606, the CPU 202 conducts a logical OR operation for data between the correction data of a pixel corresponding to the weak exposure image and the shift data generated in S605. FIG. 6D is a diagram for illustrating the shift data generated in S605, FIG. 6E is a diagram for illustrating the weak exposure image data, and FIG. 6F is a diagram for illustrating a composite image of the shift data and the weak exposure image data. The shift data of FIG. 6D is extended to 6 bits, but 0 is stored in the low-order 2 bits. For example, in the shift data, bit0, bit1, bit2, bit3, bit4, and bit5 store pieces of data, namely, 0, 0, "D0", "D1", "D2", and "D3", respectively. A logical OR of the low-order 2 bits of the shift data and 2 bits (N bits) of the weak exposure image data is determined, to finally obtain 6-bit composite image data as illustrated in FIG. 6F. That is, the above-mentioned series of arithmetic operations produces the composite image data with the pixel of the input image data being the high-order 4 bits and the weak exposure image data being the low-order 2 bits. For example, in the weak exposure image data, bit0 and bit1 store pieces of data, namely, "B0" and "B1", respectively. In the composite image data, bit0, bit1, bit2, bit3, bit4, and bit5 store pieces of data, namely, "B0", "B1", "D0", "D1", "D2", and "D3", respectively.

In S607, the CPU 202 converts pixel data of a pixel corresponding to the composite image data into an output light emitting pattern (bit pattern) of the LD 301 through use of a look-up table (hereinafter referred to as LUT) for an output light emitting pattern. The CPU 202 outputs the output light emitting pattern of the LD 301 obtained by the conversion to the PWM circuit 205.

Figure 7:
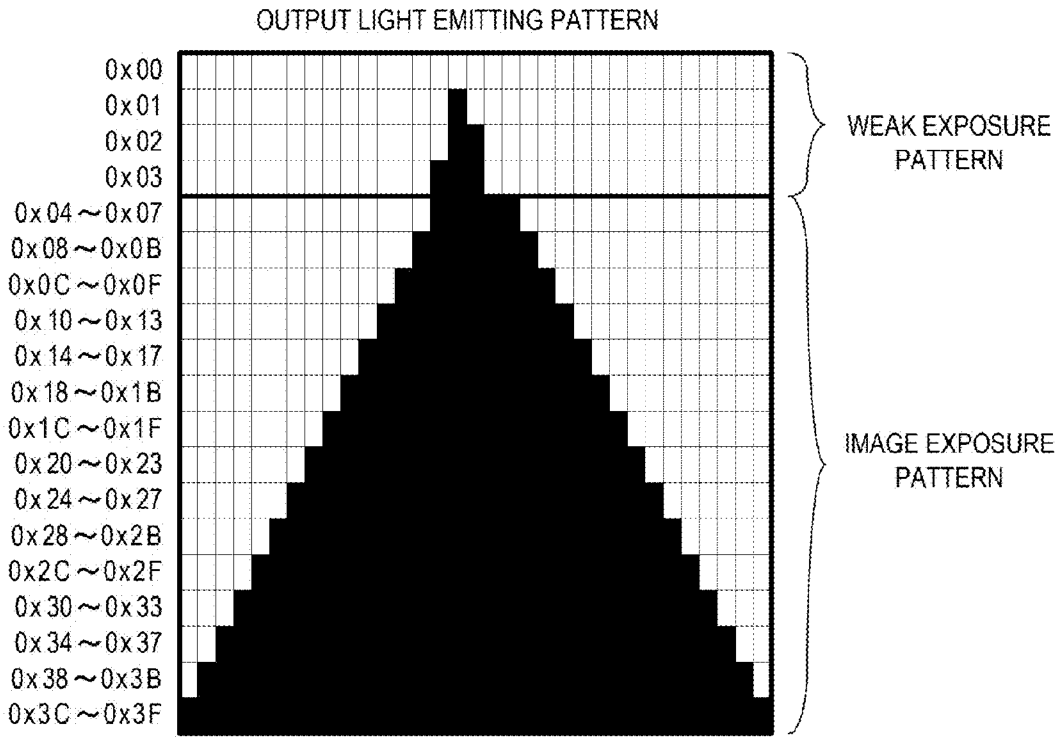
FIG. 7 is a diagram for illustrating a look-up table of an output light emitting pattern according to the first embodiment.

FIG. 7 is a diagram for illustrating the LUT to be used by the CPU 202 to convert the pixel data of the composite image data into the output light emitting pattern of the LD 301. The pixel data indicates density gradation (density value). In this embodiment, the LD 301 is configured to be able to conduct light emission control with an accuracy of one pixel divided into a predetermined number, for example, 33. That is, in this embodiment, one pixel is formed of 33 pieces of bit data.

FIG. 7 is an illustration of the output light emitting pattern (bit pattern) of the LD 301 corresponding to 6-bit values (0x00 to 0x3F in hexadecimal) of the pixel of the composite image data. In the output light emitting pattern of FIG. 7, the black blocks each indicate a piece of bit data for turning on the LD 301, and the white blocks each indicate a piece of bit data for turning off the LD 301. For example, in the pixel having the density value of 0x00, the 33 pieces of bit data are all a signal for turning off the LD 301. Further, for example, in the pixel having the density value of 0x3C to 0x3F, the 33 pieces of bit data are all a signal for turning on the LD 301 (causing the LD 301 to emit light). The low-order 2 bits of the composite image data described with reference to FIG. 6F are equivalent to the weak exposure image data of FIG. 6E. Therefore, when the composite image data is 0x00 to 0x03, it is desired that the composite image data be converted into a pattern for the weak exposure (hereinafter referred to as "weak exposure pattern"), and be converted into such a pattern as to involve an exposing time period as short as not to form a toner image. When the composite image data is 0x04 to 0x3F, the composite image data is converted into a pattern for image exposure (hereinafter referred to as an image exposure pattern). The low-order 2 bits of the composite image data are data for the weak exposure, and hence a change in the low-order 2 bits does not influence the image exposure pattern to be output. In this manner, the CPU 202 outputs the output light emitting pattern converted through the use of the LUT to the PWM circuit 205.

The PWM circuit 205 serially outputs the output light emitting pattern to the laser driver 300 bit by bit in synchronization with a clock signal. The output light emitting pattern output from the PWM circuit 205 bit by bit corresponds to the PWM signal described with reference to FIG. 12. Then, the LD 301 driven by the laser driver 300 exposes the photosensitive drum 108 in the part in which a toner image is to be formed based on the image exposure pattern, and also exposes the photosensitive drum 108 in the part in which a toner image is not to be formed based on any one of weak exposure patterns. With this configuration, in this embodiment, the background exposure can be conducted on the photosensitive drum 108. Returning to the description of the flowchart of FIG. 5A, in S608, the CPU 202 determines whether or not the input image data has been output for every pixel. When determining in S608 that the input image data has not been output for every pixel, the CPU 202 returns to the processing of S601, and when determining that the input image data has been output for every pixel, the CPU 202 returns to the flowchart of FIG. 4.

(Weak Exposure Image Generating Processing)

Figure 8:
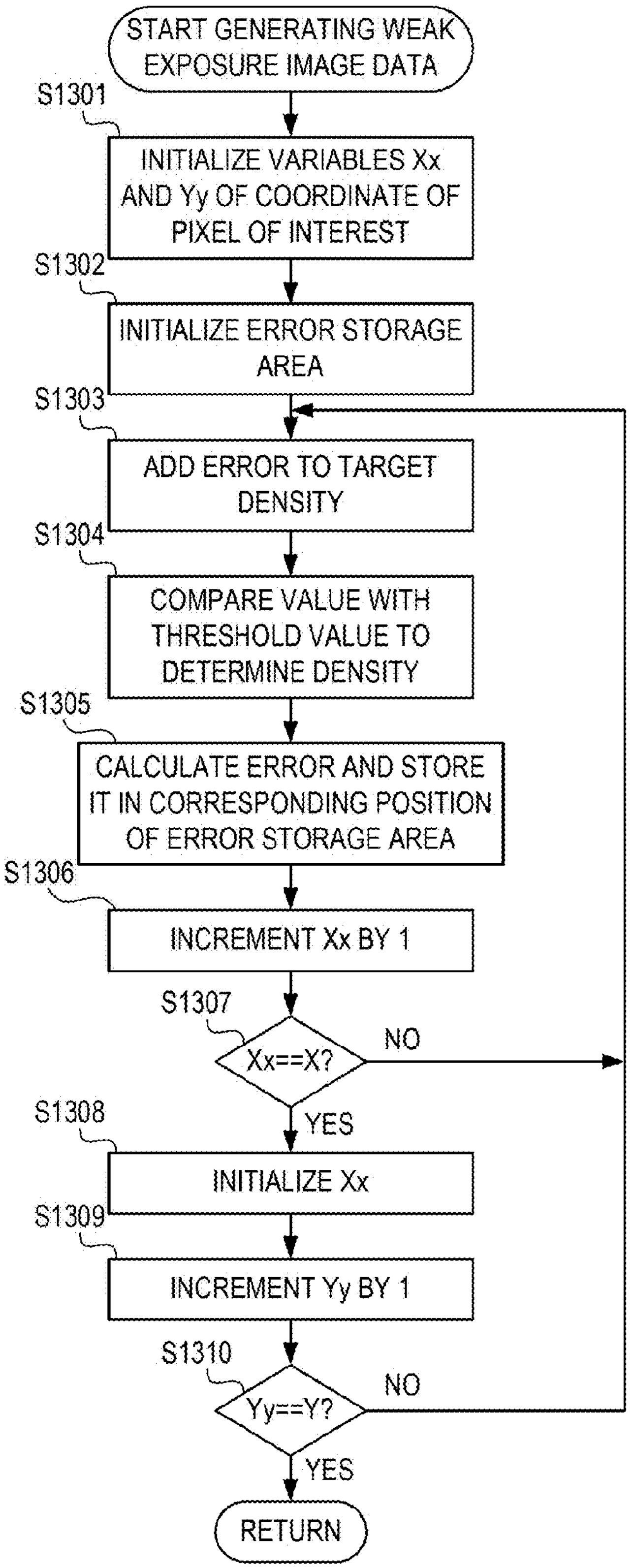
FIG. 8 is a flowchart for illustrating weak exposure image generating processing according to the first embodiment.

The weak exposure image data generating processing conducted by the CPU 202 in S502 is described in detail with reference to FIG. 8. FIG. 8 is a flowchart of processing conducted by the CPU 202 serving as a generation unit in order to generate the weak exposure image data. As described above, the weak exposure is aimed at changing the surface potential of the photosensitive drum 108 charged to the potential Vd (corresponding to Vd2 of FIG. 3H) to Vd_bg (corresponding to Vd of FIG. 3H). In order to change the surface potential of the photosensitive drum 108 from Vd to Vd_bg, the above-mentioned control to cause the LD 301 to emit light is conducted with an accuracy of one pixel divided into 33. However, in order to control the potential of the photosensitive drum 108 after the weak exposure at Vd_bg with high accuracy, 33 divisions per pixel may not be sufficient to achieve Vd_bg. In this case, in this embodiment, when one pixel is formed of 33 pieces of bit data, the lighting-up of 2.5 pieces of bit data among the 33 pieces of bit data (hereinafter represented as "2.5/33 pixel") is assumed to be an ideal weak exposure. Therefore, in the case of this embodiment, in control of causing 3/33 pixel to emit light, the surface potential Vd_bg of the photosensitive drum 108 is much lower than an ideal potential, and in control of causing 2/33 pixel to emit light, the surface potential Vd_bg of the photosensitive drum 108 is much higher than an ideal potential. A method of generating the weak exposure image that solves the above-mentioned problem is described with reference to FIG. 8.

In S1301, the CPU 202 initializes variables Xx and Yy indicating the coordinates of a pixel of interest to 0. In this case, the pixel of interest represents the pixel to be processed. As described above, the weak exposure image data has 7,016 pixels in the main scanning direction and 9,922 pixels in the sub-scanning direction, and the coordinates indicating the position of the pixel of interest are set as Xx and Yy. In S1302, the CPU 202 initializes an error storage area provided on the RAM 204. The error storage area is an area for storing an error of quantization described later. The error storage area is assumed to correspond to the weak exposure image data with the same number of pixels.

In S1303, the CPU 202 adds the value of an error corresponding to the coordinates (Xx,Yy) of the pixel of interest being currently processed, which is stored in the error storage area on the RAM 204, to a target density Dref. In this case, as described above, the target density Dref of the weak exposure is between the data 0x03 of the output light emitting pattern for which the pixel of the composite image data having the weak exposure pattern of FIG. 7 is 3/33 pixel and the data 0x02 of the output light emitting pattern for which the pixel of the composite image data having the weak exposure pattern of FIG. 7 is 2/33 pixel. With this setting, the target density Dref becomes 2.5 (Dref=2.5). When the LD 301 is caused to emit light with a light intensity corresponding to the target density Dref, the surface potential of the photosensitive drum 108 is such a potential as not to cause the adhesion of toner. In S1304, the CPU 202 compares a value obtained by adding an error to a target density and a threshold value described later, and determines the density of the pixel of interest of the weak exposure image data. In this case, a density of the pixel of interest (position Xx,Yy) of the weak exposure image data is set as D[Xx,Yy]. In this embodiment, as shown in Table 1, the threshold value set in advance is used to determine the density of the pixel of interest.

TABLE 1

| Target density + error (threshold value) | Weak exposure image density (D[Xx, Yy]) |
|---|---|
| Smaller than 1 | 0 |
| Equal to or larger than 1 and smaller than 2 | 1 |
| Equal to or larger than 2 and smaller than 3 | 2 |
| Equal to or larger than 3 | 3 |

In Table 1, the value ((target density)+error) obtained by adding the target density and the error, which is the above-mentioned threshold value, is shown in the first column, and the weak exposure image density D[Xx,Yy] of the pixel of interest (Xx,Yy) is shown in the second column. For example, in regard to the pixel of interest, when the value obtained by adding the error to the target density by the CPU 202 in S1303 becomes 2.5, the CPU 202 determines the weak exposure image density D[Xx,Yy] of the pixel of interest as 2 based on Table 1. The CPU 202 writes the determined weak exposure image density D[Xx,Yy] of the pixel of interest at an address on the RAM 204 corresponding to the position Xx,Yy of the pixel of interest. With this operation, by changing data of 2.5 equivalent to 3 bits to 2-bit data, it is possible to lower the gradation of the image.

Figure 9A:
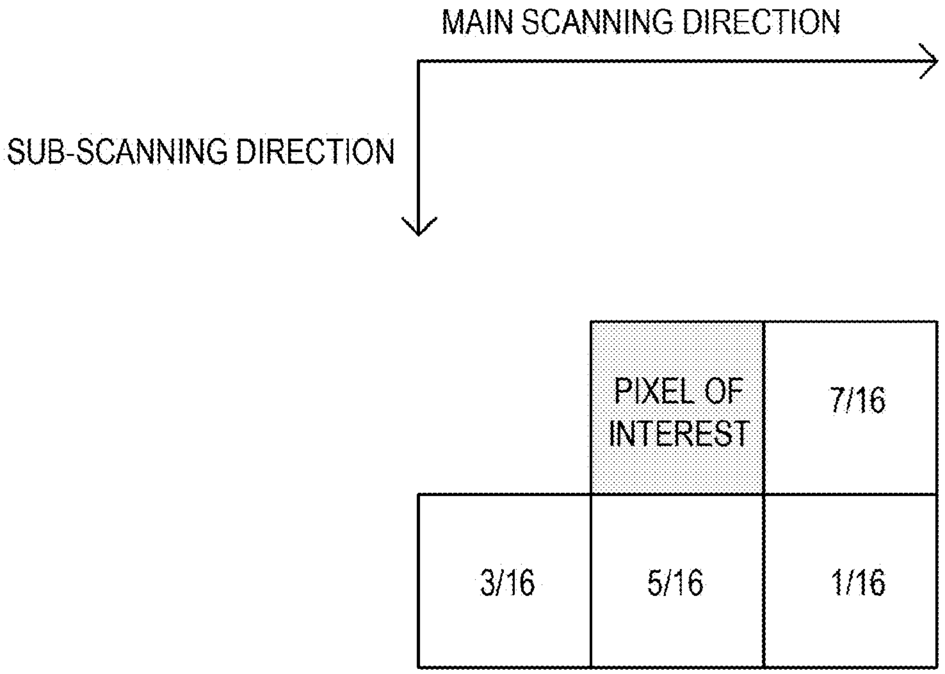
FIG. 9A is a diagram for illustrating a coefficient of error diffusion according to the first embodiment.

In S1305, the CPU 202 calculates error values of the pixels in the periphery of the pixel of interest (hereinafter referred to as "peripheral pixels") from the error of the pixel of interest, and stores the error values in corresponding locations of the error storage area on the RAM 204. In this case, the error of the pixel of interest represents a difference between the target density Dref and the density of the pixel of interest (Dref−D[Xx,Yy]). For example, when Dref=2.5 and D[Xx,Yy]=2, the error of the pixel of interest is 0.5 (=2.5-2). In FIG. 9A, a coefficient used when the error values of the pixels in the periphery are calculated from the error of the pixel of interest, that is, a coefficient used when the error is diffused to the periphery is shown. The coordinates of the pixel of interest are (Xx,Yy), and the coordinates of a pixel adjacent to the pixel of interest in the main scanning direction is (Xx+1,Yy). The pixel (coordinates (Xx+1,Yy)) adjacent to the pixel of interest is also a pixel to be the next pixel of interest. At this time, an error Enew [Xx+1,Yy] of the coordinates (Xx+1,Yy) can be expressed by the following expression through use of the coefficient of FIG. 9A.

$$Enew[Xx+1,\ Yy] = Eold[Xx+1,\ Yy] + \frac{7}{16}(Dref - D[Xx,\ Yy])$$

In the expression, Eold represents a value currently stored in an error diffusion area on the RAM 204 in regard to a target pixel, and becomes Enew through further addition of a new error calculated in S1305 in regard to the pixel of interest. In the same manner, errors to be diffused to the other peripheral pixels can be expressed by the following expression through use of the coefficients of FIG. 9A.

$$Enew[Xx-1,\ Yy+1] = Eold[Xx-1,\ Yy+1] + \frac{3}{16}(Dref - D[Xx,\ Yy])$$

$$Enew[Xx,\ Yy+1] = Eold[Xx,\ Yy+1] + \frac{5}{16}(Dref - D[Xx,\ Yy])$$

$$Enew[Xx+1,\ Yy+1] = Eold[Xx+1,\ Yy+1] + \frac{1}{16}(Dref - D[Xx,\ Yy])$$

In S1306, the CPU 202 increments the value of Xx in the main scanning direction by one (Xx=Xx+1). That is, the CPU 202 scans the processing in the main scanning direction while shifting the pixel of interest by one pixel in the main scanning direction. In S1307, the CPU 202 determines whether or not the value of Xx matches X (Xx==X). X represents the size of the weak exposure image data along the main scanning direction, which means that the CPU 202 determines whether or not the processing has been conducted up to a trailing edge in the main scanning direction. In this embodiment, the size X along the main scanning direction is set to 7,016 pixels.

When determining in S1307 that the value of Xx matches X, the CPU 202 advances to the processing of S1308, and when determining that the value of Xx does not match X, the CPU 202 returns to the processing of S1303. In this manner, the CPU 202 repeats the processing up to the trailing edge in the main scanning direction, that is, until the processing has been conducted for the data corresponding to the size X along the main scanning direction. In S1308, the CPU 202 initializes the value of Xx to 0. In S1309, the CPU 202 increments Yy for the sub-scanning direction by one (Yy=Yy+1). That is, the CPU 202 scans the processing in the sub-scanning direction while shifting the pixel of interest by one pixel in the sub-scanning direction. In S1310, the CPU 202 determines whether or not the value of Yy matches Y (Yy==Y). Y represents the size of the weak exposure image data along the sub-scanning direction, which means that the CPU 202 determines whether or not the processing has been conducted up to a trailing edge in the sub-scanning direction. In this embodiment, the size Y along the sub-scanning direction is set to 9,922 pixels. When determining in S1310 that the value of Yy matches Y, the CPU 202 brings the weak exposure image data generating processing to an end, and returns to the processing of FIG. 4. Meanwhile, when determining in S1310 that the value of Yy does not match Y, the CPU 202 returns to the processing of S1303 to repeat the processing up to the trailing edge of the sub-scanning direction, that is, until the processing has been conducted for the data corresponding to the size Y along the sub-scanning direction.

When the light emission control of the LD 301 is conducted with such an accuracy of one pixel divided into 33 as described above in this embodiment, Vd_bg is too low with the light emission of the 3/33 pixel, and Vd_bg is too high with the light emission of the 2/33 pixel. In such a case, the density of the pixel of interest is lowered from the target density, and the error with respect to the target density corresponding to the lowered amount is diffused to the peripheral pixels. In this manner, this embodiment relates to a configuration for conducting error diffusion for the light intensity of the weak exposure to be a target. With this configuration, even when a resolution per pixel of an output is small, a predetermined density, namely, a predetermined light intensity is achieved with a plurality of pixels (dots) including the pixel of interest and its peripheral pixels. That is, the background exposure can be conducted with the target density, that is, the target light intensity of the LD 301 as area gradation. In this embodiment, the target density is set with 3 bits, but by increasing the number of bits of the target density, it is possible to conduct the background exposure with higher accuracy. In this case, effects of this embodiment are described with reference to FIG. 9B and FIG. 9C.

Figure 9B:
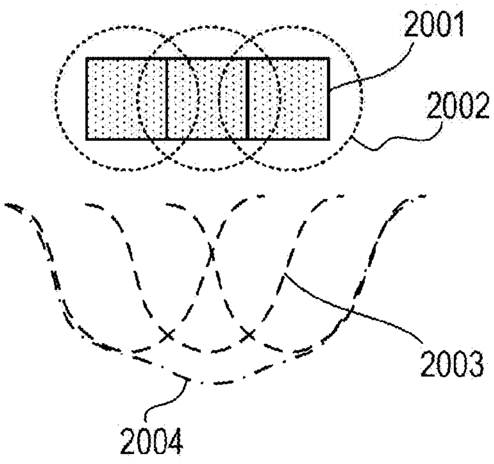
FIG. 9B and FIG. 9C are diagrams for illustrating a latent image (potential) of a drum surface due to a weak exposure.

FIG. 9B is a diagram for illustrating three pixels 2001 on the photosensitive drum 108 arranged along the main scanning direction and spots 2002 of light beams to be applied to the photosensitive drum 108 when the weak exposure is conducted with the same light intensity by the LD 301, the spots 2002 being indicated by the dotted circles. Further, FIG. 9B is also a diagram for illustrating a latent image formed on the photosensitive drum 108 as a result of conducting the weak exposure illustrated in the upper part of FIG. 9B, and a depth of the latent image indicates the surface potential of the photosensitive drum 108. As illustrated in FIG. 9B, the spot 2002 of the light beam on the photosensitive drum 108 is larger than one pixel 2001 on the photosensitive drum 108, and the latent image is formed for each pixel based on the Gaussian distribution. The latent image formed for the three pixels 2001 is an integration of latent images 2003 formed for the respective pixels indicated by the broken lines based on the Gaussian distribution, and a latent image 2004 based on an integrated light intensity indicated by the one-dot chain line is formed for the three pixels 2001 on the photosensitive drum 108.

Figure 9C:
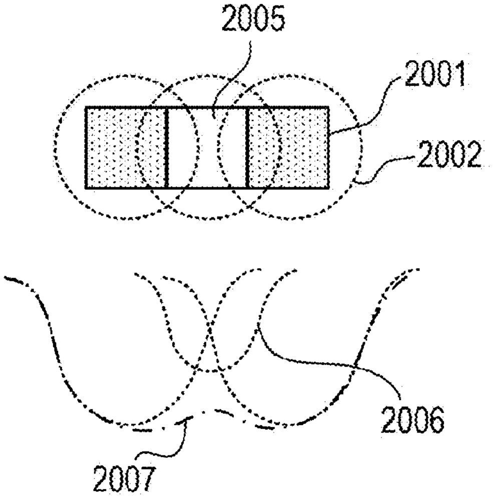

Further, FIG. 9C is a diagram for illustrating a case of the weak exposure image in which a central pixel 2005 among the three pixels 2001 on the photosensitive drum 108 has a low density. Because the density of the central pixel 2005 is low, as a result of converting the image data into the output light emitting pattern based on the LUT, a lighting-up period of time within one pixel is short, and hence a latent image 2006 corresponding to the central pixel 2005 exhibits a smaller depth than the depth of the latent images corresponding to the pixels on both sides. In other words, the surface potential of the photosensitive drum 108 corresponding to the central pixel 2005 is higher than the surface potential of the photosensitive drum 108 corresponding to the pixels on both sides. Therefore, as illustrated in FIG. 9C, a latent image 2007 formed on the photosensitive drum 108 based on an integrated light intensity indicated by the one-dot chain line is a latent image having a smoother shape to some extent and exhibiting a smaller depth than in the case of FIG. 9B. That is, by conducting the weak exposure, it is possible to finely control the surface potential of the photosensitive drum 108.

In this embodiment, an area corresponding to the same number of pixels as the number of pixels of the weak exposure image data is reserved on the RAM 204 for the error of the pixel of interest, but it is possible to reserve a smaller area by changing the form of implementation. The configuration for realizing the details described above is not intended to impose any limitations on the scope of the present invention.

As described above, according to this embodiment, the background exposure can be conducted easily and with higher accuracy.

Second Embodiment

A second embodiment of the present invention is the same as the first embodiment except for the weak exposure image data generating processing of S502 executed by the CPU 202 as described with reference to FIG. 4. Therefore, the same components as those described in the first embodiment are denoted by the same reference symbols, and descriptions thereof are omitted.

Figure 10:
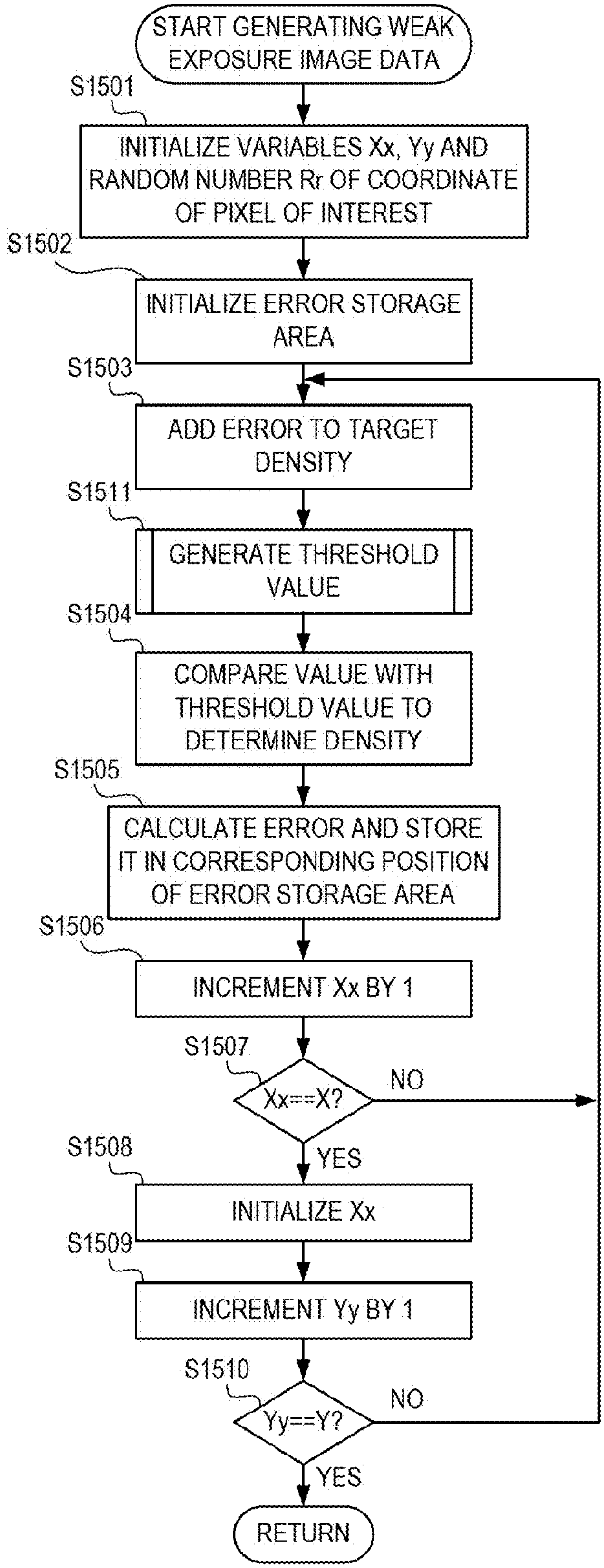
FIG. 10 is a flowchart for illustrating weak exposure image generating processing according to the second embodiment.

FIG. 10 is a flowchart of processing conducted by the CPU 202 serving as the generation unit in order to generate the weak exposure image data according to this embodiment. In S1501, the CPU 202 initializes variables Xx and Yy indicating the coordinates of a pixel of interest to 0. This processing is the same as the processing of S1301 of FIG. 8 described in the first embodiment. In this embodiment, the CPU 202 further initializes a 32-bit random number Rr. The random number Rr is initialized to a value other than 0. The random number Rr is described later in detail. In this embodiment, the random number Rr has 32 bits, but another number of bits may be employed depending on an arithmetic processing capacity of the CPU 202. The processing of S1502 and S1503 is the same as the processing of S1302 and S1303 described with reference to FIG. 8, and descriptions thereof are omitted. The target density Dref is also set to 2.5 in this embodiment.

Figure 11:
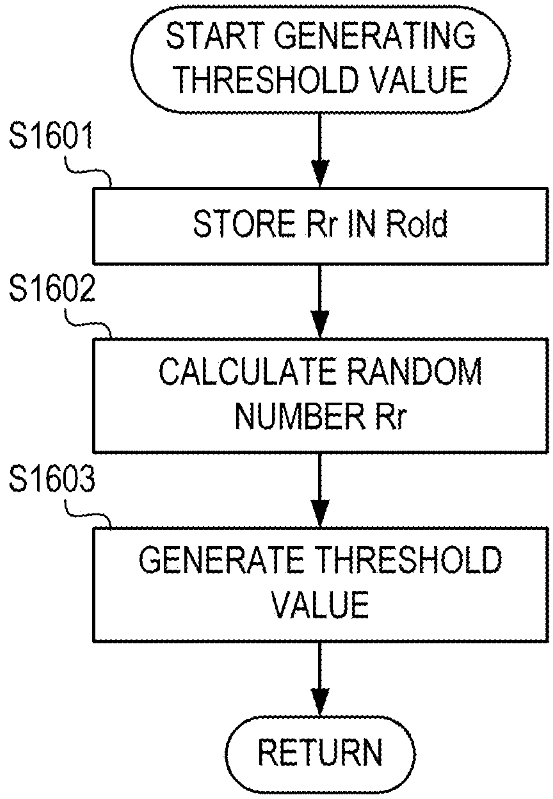
FIG. 11 is a flowchart for illustrating threshold value generating processing according to the second embodiment.

In S1511, the CPU 202 generates the threshold value. Threshold value generating processing executed by the CPU 202 in S1511 is described in detail with reference to the flowchart of FIG. 11. In S1601, the CPU 202 stores a value of the random number Rr in Rold. Rold is a variable used when the threshold value is calculated. In S1602, the CPU 202 calculates the random number Rr. In this embodiment, a generation polynomial expression for generating a pseudo-random number used when the random number Rr is calculated is as follows.

$$x^{31}+x^{21}+x+1$$

Therefore, assuming that the current random number value is Rold and that a new random number value obtained after the generation is Rr, the CPU 202 conducts the following calculation.

$$R_r[0]=R_{old}[31]\oplus R_{old}[21]\oplus R_{old}[1]\oplus R_{old}[0]$$

$$R_r[N]=R_{old}[N-1]$$

N represents an integer equal to or larger than 1 and equal to or smaller than 31.

The CPU 202 uses those expressions to calculate the 32-bit random number Rr.

In S1603, the CPU 202 generates the threshold value. The CPU 202 sets, as the threshold value, the low-order 2 bits (set as Rr[1:0]) of the random number Rr calculated in S1602.

(Method of Determining Threshold Value)

TABLE 2(a)

| Rr[1:0] = 0 | |
|---|---|
| Target density + error (threshold value) | Weak exposure image density (D[Xx, Yy]) |
| Smaller than 0.75 | 0 |
| Equal to or larger than 0.75 and smaller than 1.75 | 1 |
| Equal to or larger than 1.75 and smaller than 2.75 | 2 |
| Equal to or larger than 2.75 | 3 |

TABLE 2(b)

| Rr[1:0] = 1 | |
|---|---|
| Target density + error (threshold value) | Weak exposure image density (D[Xx, Yy]) |
| Smaller than 1.25 | 0 |
| Equal to or larger than 1.25 and smaller than 2.25 | 1 |
| Equal to or larger than 2.25 and smaller than 3.25 | 2 |
| Equal to or larger than 3.25 | 3 |

TABLE 2(c)

| Rr[1:0] = 2 or 3 | |
|---|---|
| Target density + error (threshold value) | Weak exposure image density (D[Xx,Yy]) |
| Smaller than 1 | 0 |
| Equal to or larger than 1 and smaller than 2 | 1 |
| Equal to or larger than 2 and smaller than 3 | 2 |
| Equal to or larger than 3 | 3 |

The following description is made with reference to Tables 2(a) to 2(c). In Tables 2(a) to 2(c), in regard to cases where Rr[1:0] of the random number Rr is predetermined values, the value ((target density)+error) obtained by adding the target density and the error, which is the threshold value, is shown in the first column, and the weak exposure image density D[Xx,Yy] of the pixel of interest (Xx,Yy) is shown in the second column. As shown in Table 2(a), when Rr[1:0] of the random number Rr is 0, the threshold value is lowered by 0.25 on the whole in Table 2(a) compared with the threshold value shown in Table 1 of the first embodiment. Further, as shown in Table 2(b), when Rr[1:0] of the random number Rr is 1, the threshold value is raised by 0.25 on the whole in Table 2(b) compared with the threshold value shown in Table 1 of the first embodiment. In addition, as shown in Table 2(c), when Rr[1:0] of the random number Rr is 2 or 3, the threshold value is equivalent to the threshold value shown in Table 1 of the first embodiment. In this manner, by changing the threshold value depending on the value of the random number Rr calculated in S1602, it is possible to prevent a texture having a constant period from being caused even when an ideal weak exposure image that is entirely uniform is subjected to the error diffusion.

In S1504 of FIG. 10, the CPU 202 compares the threshold value generated in S1511 and the value obtained by adding the error to the target density, and determines the density of the pixel of interest. In this embodiment, the density of the pixel of interest is determined under a state in which the threshold value varies depending on the value of the random number Rr as shown in Tables 2(a) to 2(c). The processing of S1505 to S1510 is the same as the processing of S1305 to S1310 of FIG. 8, and hence descriptions thereof are omitted.

As in this embodiment, by randomly determining the threshold value based on the random number when the gradation is lowered through the error diffusion, it is possible to alleviate a periodic texture caused when an image having a uniform density is subjected to the error diffusion.

Thus, according to this embodiment, a background exposure can be conducted easily with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-119526, filed Jun. 12, 2015, which is hereby incorporated by reference herein in its entirety.

What is claimed is:

1. An image forming apparatus configured to form an image based on input image data, the image forming apparatus comprising:

a photosensitive member;

a charging unit configured to charge the photosensitive member;

a light irradiating unit configured to irradiate the photosensitive member charged by the charging unit with light;

a developing unit configured to develop an electrostatic latent image with toner, the electrostatic latent image being formed on the photosensitive member by the light irradiating unit irradiating the photosensitive member;

a processing unit configured to generate a plural-bit density data indicating a density based on the input image data, configured to generate processing data by correcting the plural-bit density data based on correction data stored in a storage unit, configured to convert the processing data into a plural-bit binary drive data corresponding to a value of the processing data, and configured to serially output the plural-bit binary drive data bit by bit to generate a drive signal; and a drive unit configured to drive the light irradiating unit based on the drive signal generated by the processing unit.

2. An image forming apparatus according to claim 1, further comprising a storage unit configured to store a conversion table for converting the processing data into the plural-bit binary drive data, wherein the processing unit is configured to convert the processing data into the plural-bit binary drive data based on the conversion table.

3. An image forming apparatus according to claim 2, wherein the storage unit is configured to store the correction data.

4. An image forming apparatus according to claim 2, wherein the conversion table is set so as to inhibit the toner from being developed on the photosensitive member irradiated with the light when the drive unit drives the light irradiating unit based on the drive signal generated based on the processing data generated based on the density data indicating a density value of 0 and the correction data.

5. An image forming apparatus according to claim 1, wherein the drive signal comprises a PWM signal comprising a pulse.

6. An image forming apparatus according to claim 5, wherein the drive signal generated based on the processing data generated based on the density data indicating a density value of 0 and the correction data comprises a pulse.

7. An image forming apparatus according to claim 5, wherein the pulse generated based on the density data indicating a density value of 0 and the correction data has a width narrower than a width of the pulse generated based on the density data indicating a minimum density value and the correction data.

8. An image forming apparatus configured to form an image based on input image data, the image forming apparatus comprising:

a photosensitive member;

a charging unit configured to charge the photosensitive member;

a light irradiating unit configured to irradiate the photosensitive member charged by the charging unit with light;

a developing unit configured to develop an electrostatic latent image with toner, the electrostatic latent image being formed on the photosensitive member by the light irradiating unit irradiating the photosensitive member;

a processing unit configured to generate M-bit (M is an integer equal to or larger than 2) density data indicating a density based on the input image data, configured to generate (M+N)-bit processing data based on the M-bit density data and N-bit (N is an integer equal to or larger than 1) correction data, configured to convert the (M+N)-bit processing data into a plural-bit binary drive data corresponding to a value of the (M+N)-bit processing data, and configured to serially output the plural-bit binary drive data bit by bit to generate a drive signal; and a drive unit configured to drive the light irradiating unit based on the drive signal generated by the processing unit.

9. An image forming apparatus according to claim 8, further comprising a storage unit configured to store a conversion table for converting the (M+N)-bit processing data into the plural-bit binary drive data, wherein the processing unit is configured to convert the (M+N)-bit processing data into the plural-bit binary drive data based on the conversion table.

10. An image forming apparatus according to claim 9, wherein the storage unit is configured to store the N-bit correction data.

11. An image forming apparatus according to claim 9, wherein the conversion table is set so as to inhibit the toner from being developed on the photosensitive member irradiated with the light when the drive unit drives the light irradiating unit based on the drive signal generated based on the (M+N)-bit processing data generated based on the M-bit density data indicating a density value of 0 and the N-bit correction data.

12. An image forming apparatus according to claim 8, wherein the drive signal comprises a PWM signal comprising a pulse.

13. An image forming apparatus according to claim 12, wherein the drive signal generated based on the (M+N)-bit processing data generated based on the M-bit density data indicating a density value of 0 and the N-bit correction data comprises a pulse.

14. An image forming apparatus according to claim 12, wherein the pulse generated based on the M-bit density data indicating a density value of 0 and the N-bit correction data has a width narrower than a width of the pulse generated based on the M-bit density data indicating a minimum density value and the N-bit correction data.

15. An image forming apparatus according to claim 8, wherein in the (M+N)-bit processing data, the M-bit density data is set at a bit position higher than a bit position of the N-bit data.

16. An image forming apparatus configured to form an image based on input image data, the image forming apparatus comprising:

a first image forming unit comprising:

a first photosensitive member;

a first charging unit configured to charge the first photosensitive member;

a first light irradiating unit configured to irradiate the first photosensitive member charged by the first charging unit with light;

a first developing unit configured to develop an electrostatic latent image with toner, the electrostatic latent image being formed on the first photosensitive member by the first light irradiating unit irradiating the first photosensitive member; and a first drive unit configured to drive the first light irradiating unit based on a first drive signal;

a second image forming unit comprising:

a second photosensitive member;

a second charging unit configured to charge the second photosensitive member;

a second light irradiating unit configured to irradiate the second photosensitive member charged by the second charging unit with light;

a second developing unit configured to develop an electrostatic latent image with toner, the electrostatic latent image being formed on the second photosensitive member by the second light irradiating unit irradiating the second photosensitive member; and a second drive unit configured to drive the second light irradiating unit based on a second drive signal;

a transfer unit comprising a transfer belt onto which a toner image developed on the first photosensitive member and a toner image developed on the second photosensitive member are to be transferred, the transfer unit being configured to transfer the toner images transferred onto the transfer belt onto a recording medium, the toner image on the second photosensitive member being transferred so as to be overlaid on the toner image transferred onto the transfer belt from the first photosensitive member; and a processing unit configured to generate the first drive signal and the second drive signal based on input image data, to generate M-bit (M is an integer equal to or larger than 2) density data indicating a density based on the input image data, configured to generate (M+N)-bit processing data based on the M-bit density data and N-bit (N is an integer equal to or larger than 1) correction data, configured to convert the (M+N)-bit processing data into a plural-bit binary drive data corresponding to a value of the (M+N)-bit processing data, and configured to serially output the plural-bit binary drive data bit by bit to generate the second drive signal.

17. An image forming apparatus according to claim 16, further comprising a storage unit configured to store a conversion table for converting the (M+N)-bit processing data into the plural-bit binary drive data, wherein the processing unit is configured to convert the (M+N)-bit processing data into the binary drive data based on the conversion table.

18. An image forming apparatus according to claim 17, wherein the storage unit is configured to store the N-bit correction data.

19. An image forming apparatus according to claim 16, wherein the second drive signal comprises a PWM signal comprising a pulse.

20. An image forming apparatus according to claim 19, wherein the second drive signal generated based on the (M+N)-bit processing data generated based on the M-bit density data indicating a density value of 0 and the N-bit correction data comprises a pulse.

21. An image forming apparatus according to claim 17, wherein the conversion table is set so as to inhibit the toner from being developed on the second photosensitive member irradiated with the light when the second drive unit drives the second light irradiating unit based on the second drive signal generated based on the (M+N)-bit processing data generated based on the M-bit density data indicating a density value of 0 and the N-bit correction data.

22. An image forming apparatus according to claim 19, wherein the pulse generated based on the M-bit density data indicating a density value of 0 and the N-bit correction data has a width narrower than a width of the pulse generated based on the M-bit density data indicating a minimum density value and the N-bit correction data.

23. An image forming apparatus configured to form an image based on input image data, the image forming apparatus comprising:

a first image forming unit comprising:

a first photosensitive member;

a first charging unit configured to charge the first photosensitive member;

a first light irradiating unit configured to irradiate the first photosensitive member charged by the first charging unit with light;

a first developing unit configured to develop an electrostatic latent image with toner, the electrostatic latent image being formed on the first photosensitive member by the first light irradiating unit irradiating the first photosensitive member; and a first drive unit configured to drive the first light irradiating unit based on a first drive signal;

a second image forming unit comprising:

a second photosensitive member;

a second charging unit configured to charge the second photosensitive member;

a second light irradiating unit configured to irradiate the second photosensitive member charged by the second charging unit with light;

a second developing unit configured to develop an electrostatic latent image with toner, the electrostatic latent image being formed on the second photosensitive member by the second light irradiating unit irradiating the second photosensitive member; and a second drive unit configured to drive the second light irradiating unit based on a second drive signal;

a transfer unit comprising a transfer belt onto which a toner image developed on the first photosensitive member and a toner image developed on the second photosensitive member are to be transferred, the transfer unit being configured to transfer the toner images transferred onto the transfer belt onto a recording medium, the toner image on the second photosensitive member being transferred so as to be overlaid on the toner image transferred onto the transfer belt from the first photosensitive member; and a processing unit configured to generate the first drive signal and the second drive signal based on input image data, configured to generate a plural-bit density data indicating a density based on the input image data, configured to generate processing data by correcting the plural-bit density data based on correction data stored in a storage unit, configured to convert the processing data into a plural-bit binary drive data corresponding to a value of the processing data, and configured to serially output the plural-bit binary drive data bit by bit to generate the second drive signal.

24. An image forming apparatus according to claim 23, further comprising a storage unit configured to store a conversion table for converting the processing data into the plural-bit binary drive data, wherein the processing unit is configured to convert the processing data into the binary drive data based on the conversion table.

25. An image forming apparatus according to claim 24, wherein the storage unit is configured to store the correction data.

26. An image forming apparatus according to claim 23, wherein the second drive signal comprises a PWM signal comprising a pulse.

27. An image forming apparatus according to claim 26, wherein the second drive signal generated based on the processing data generated based on the density data indicating a density value of 0 and the correction data comprises a pulse.

28. An image forming apparatus according to claim 24, wherein the conversion table is set so as to inhibit the toner from being developed on the second photosensitive member irradiated with the light when the second drive unit drives the second light irradiating unit based on the second drive signal generated based on the processing data generated based on the density data indicating a density value of 0 and the correction data.

29. An image forming apparatus according to claim 26, wherein the pulse generated based on the density data indicating a density value of 0 and the correction data has a width narrower than a width of the pulse generated based on the density data indicating a minimum density value and the correction data.

* * * * *